(12) United States Patent
Nayeb Nazar et al.

(10) Patent No.: US 9,854,589 B2
(45) Date of Patent: Dec. 26, 2017

(54) INTERFERENCE MANAGEMENT AND INTERFERENCE ALIGNMENT IN WIRELESS NETWORKS

(71) Applicant: INTERDIGITAL PATENT HOLDINGS, INC., Wilmington, DE (US)

(72) Inventors: Shahrokh Nayeb Nazar, San Diego, CA (US); Afshin Haghighat, Ile-Bizard (CA); Lujing Cai, Morganville, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/199,642

(22) Filed: Mar. 6, 2014

(65) Prior Publication Data

US 2014/0256341 A1    Sep. 11, 2014

Related U.S. Application Data

(60) Provisional application No. 61/773,563, filed on Mar. 6, 2013.

(51) Int. Cl.
*H04W 72/08* (2009.01)
*H04J 11/00* (2006.01)
(Continued)

(52) U.S. Cl.
CPC ....... *H04W 72/082* (2013.01); *H04J 11/0023* (2013.01); *H04B 7/024* (2013.01);
(Continued)

(58) Field of Classification Search
None
See application file for complete search history.

(56) References Cited

U.S. PATENT DOCUMENTS

2002/0027957 A1* 3/2002 Paulraj ................ H04B 7/0842
                                                       375/267
2009/0059844 A1* 3/2009 Ko ...................... H04B 7/0413
                                                       370/328

(Continued)

FOREIGN PATENT DOCUMENTS

WO    WO 2011/041981 A1    4/2011

OTHER PUBLICATIONS

3GPP TS 36.213 V8.5.0, "Physical layer procedures". Feb. 2009, www.etsi.org.*

(Continued)

*Primary Examiner* — Matthew Sams
(74) *Attorney, Agent, or Firm* — Condo Roccia Koptiw LLP

(57) ABSTRACT

Interference mitigation (e.g., interference suppression and/or interference cancellation) in a wireless communications system may include interference alignment techniques. Interference alignment may be performed to concurrently mitigate the effects of multiple types of interference (e.g., inter-cell interference and intra-cell interference). Interference management using interference alignment may enhance spectral efficiency in an interference-limited communications system, such as a wireless communications system (e.g., a cellular system). Interference alignment techniques may be applied to a homogeneous wireless communications system (e.g., including one or macro base stations). Interference alignment techniques may be applied to a heterogeneous wireless communications system (e.g., including one or macro base stations and one or more overlaid low-power nodes, such as small cells, remote radio heads (RRHs), or the like).

18 Claims, 17 Drawing Sheets

(51) Int. Cl.
*H04B 7/024* (2017.01)
*H04B 7/0452* (2017.01)
*H04B 7/06* (2006.01)
*H04L 5/00* (2006.01)

(52) U.S. Cl.
CPC .......... *H04B 7/0452* (2013.01); *H04B 7/0634* (2013.01); *H04L 5/0073* (2013.01); *Y02B 60/50* (2013.01)

(56) References Cited

U.S. PATENT DOCUMENTS

| | | | | |
|---|---|---|---|---|
| 2010/0027456 | A1* | 2/2010 | Onggosanusi | H04B 7/024 370/312 |
| 2010/0227613 | A1* | 9/2010 | Kim | H04L 25/03828 455/434 |
| 2011/0268166 | A1* | 11/2011 | Chen et al. | 375/224 |
| 2012/0113844 | A1* | 5/2012 | Krishnamurthy | 370/252 |
| 2012/0128050 | A1* | 5/2012 | Xu et al. | 375/224 |
| 2012/0289267 | A1* | 11/2012 | Seo et al. | 455/501 |
| 2013/0053077 | A1 | 2/2013 | Barbieri et al. | |
| 2013/0267240 | A1* | 10/2013 | Fu | H04L 1/1887 455/452.2 |

OTHER PUBLICATIONS

Gollakota, Interference Alignment and Cancellation, Publisher: Association for Computing Machinery (ACM), Aug. 2009.*
O. El Ayach, S. W. Peters and R. W. Heath Jr. "Real world feasibility of interference alignment using MIMO-OFDM channel measurements", Proc. IEEE MILCOM, pp. 1-6 2009.*
3rd Generation Partnership Project (3GPP), R1-100063, "Eigen-Feedback Reduction by Sub-Space Signaling", Toshiba, 3GPP TSG RAN WG1 Meeting #59bis, Valencia, Spain, Jan. 18-22, 2010, 6 pages.
3rd Generation Partnership Project (3GPP), R1-112236, "Scenarios for Further Enhanced Non-CA Based ICIC", InterDigital Communications, LLC, 3GPP TSG RAN WG1 Meeting #66, Athens, Greece, Aug. 22-26, 2011, 4 pages.
3rd Generation Partnership Project (3GPP), R1-131342, "Interference Coordination in Small Cell Deployments", InterDigital, 3GPP TSG-RAN WG1 Meeting #72bis, Chicago, USA, Apr. 15-19, 2013, 5 pages.

* cited by examiner

|  | Picocell | Macrocell 1 | Macrocell 2 |
|---|---|---|---|
| Estimate interference of Macrocell 2 | Muted | Muted | CSI-RS |
| Estimate interference of Macrocell 1 | Muted | CSI-RS | Muted |

FIG. 12A

|  | Picocell | Macrocell 1 | Macrocell 2 |
|---|---|---|---|
| Estimate aggregated interference of Macrocell 1 and Macrocell 2 | Muted | CSI-RS | CSI-RS |

FIG. 12B

|  | Macrocell 1 | RRH 2 |
|---|---|---|
| Estimate interference of Macrocell 2 | Muted | CSI-RS |
| Estimate interference of RRH 2 | CSI-RS | Muted |

FIG. 13

|  | Picocell | Macrocell 1 | Macrocell 2 |
|---|---|---|---|
| Estimate interference of Macrocell 2 | ZP | Muted | Data |
| Estimate interference of Macrocell 1 | ZP | Data | Muted |

FIG. 14A

|  | Picocell | Macrocell 1 | Macrocell 2 |
|---|---|---|---|
| Estimate aggregated interference of Macrocell 1 and Macrocell 2 | ZP | Data | Data |

FIG. 14B

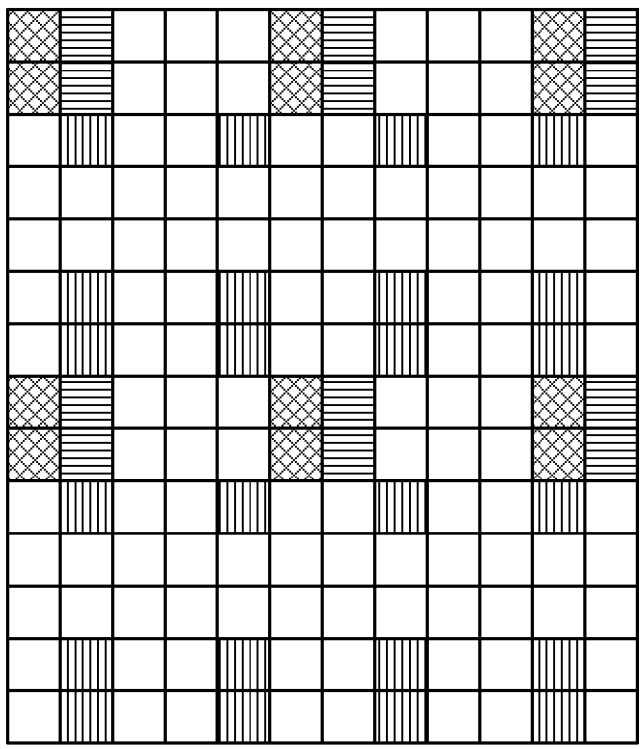
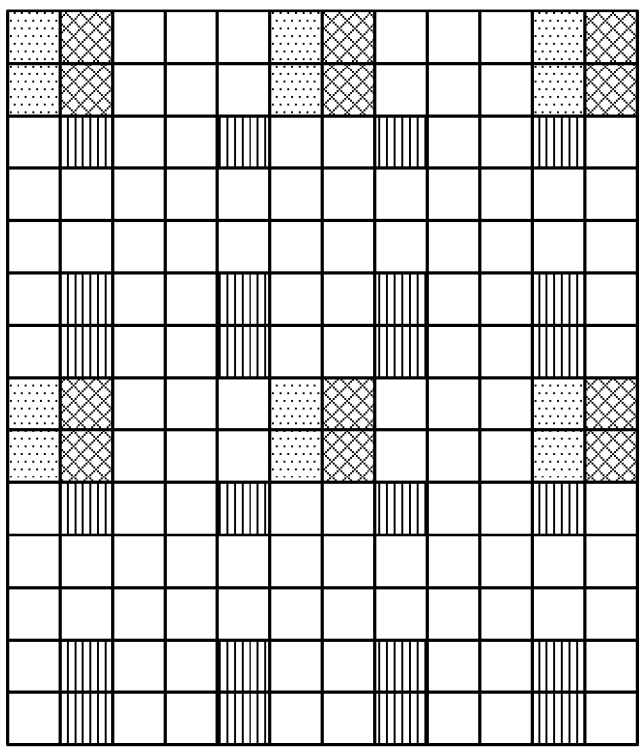
FIG. 15

INTERFERENCE MANAGEMENT AND INTERFERENCE ALIGNMENT IN WIRELESS NETWORKS

CROSS-REFERENCE TO RELATED APPLICATIONS

This application claims priority to U.S. provisional patent application No. 61/773,563, filed Mar. 6, 2013, which is incorporated herein by reference in its entirety.

BACKGROUND

As demand for wireless communication spectrum continues to increase, such as demand associated with applications executing on wireless communication devices (e.g., smart phones), spectrum shortages may occur. Spectrum shortages may detrimentally affect the performance of such applications.

One approach to mitigating such spectrum shortages is to increase the density of spectrum available to wireless communication devices. Spectrum density in a location may be increased by configuring multiple layers, or tiers, of spectrum for wireless communications. For example, within the wireless communication coverage area of a macrocell, one or more other sources of wireless communication spectrum may be defined, such as one or more femtocells, picocells, microcells, remote radio heads, and the like. One or more such sources of wireless communication spectrum may overlap one another, for example within the coverage area of a macrocell.

But as wireless communication spectrum density increases in a location, wireless communication devices within such a location may be subjected to additional sources of interference. Such additional interference may limit the wireless communication bandwidth gains that may be realized with increased spectrum density. Known methods of mitigating interference received at a wireless communication device may not be suitably effective for application in locations where dense, multi-tiered wireless communication spectrum is available.

SUMMARY

Interference mitigation (e.g., interference suppression and/or interference cancellation) in a wireless communications system may include interference alignment techniques. Interference alignment may be performed to concurrently mitigate the effects of multiple types of interference (e.g., inter-cell interference and intra-cell interference). Interference management using interference alignment may enhance spectral efficiency in an interference-limited communications system, such as a wireless communications system (e.g., a cellular system). Interference alignment techniques may be applied to a homogeneous wireless communications system (e.g., including one or macro base stations). Interference alignment techniques may be applied to a heterogeneous wireless communications system (e.g., including one or macro base stations and one or more overlaid low-power nodes, such as small cells, remote radio heads (RRHs), or the like).

A process for mitigating interference received at a wireless transmit receive unit (WTRU) may include measuring interference observed at the WTRU. The WTRU may be associated with a first transmission point in a communications system. The interference may include respective transmissions associated with second and third transmission points that are different from the first transmission point. The process may include estimating, based upon the measured interference, an interference subspace related to the WTRU. The process may include quantizing the estimated interference subspace to a quantization subspace. The process may include sending a feedback report that is indicative of the quantization subspace. The process may include performing interference mitigation on interfering signals observed at the WTRU. The interfering signals may be associated with the second and third transmission points, and may be aligned with respect to the quantization subspace.

A WTRU that is associated with a first transmission point in a communications system may include a processor that is configured to measure interference observed at the WTRU. The interference may include respective transmissions associated with second and third transmission points that are different from the first transmission point. The processor may be configured to estimate, based upon the measured interference, an interference subspace related to the WTRU. The processor may be configured to quantize the estimated interference subspace to a quantization subspace. The processor may be configured to send a feedback report that is indicative of the quantization subspace. The processor may be configured to perform interference mitigation on interfering signals observed at the WTRU. The interfering signals may be associated with the second and third transmission points, and may be aligned with respect to the quantization subspace.

BRIEF DESCRIPTION OF THE DRAWINGS

FIGS. 12A and 12B depict example configuration modes for performing interference measurement using non-zero power channel state information reference signals (NZP CSI-RS) in a wireless communications system.

FIG. 13 depicts example configuration modes for performing interference measurements using NZP CSI-RS in a wireless communications system that employs CoMP transmission.

FIGS. 14A and 14B depict example configuration modes for performing interference measurements using zero power-channel state information reference signals in a wireless communications system.

FIG. 15 depicts example subframes that may be used in performing interference subspace estimation based on demodulation reference signals (DM-RSs).

DETAILED DESCRIPTION

Figure 1A:
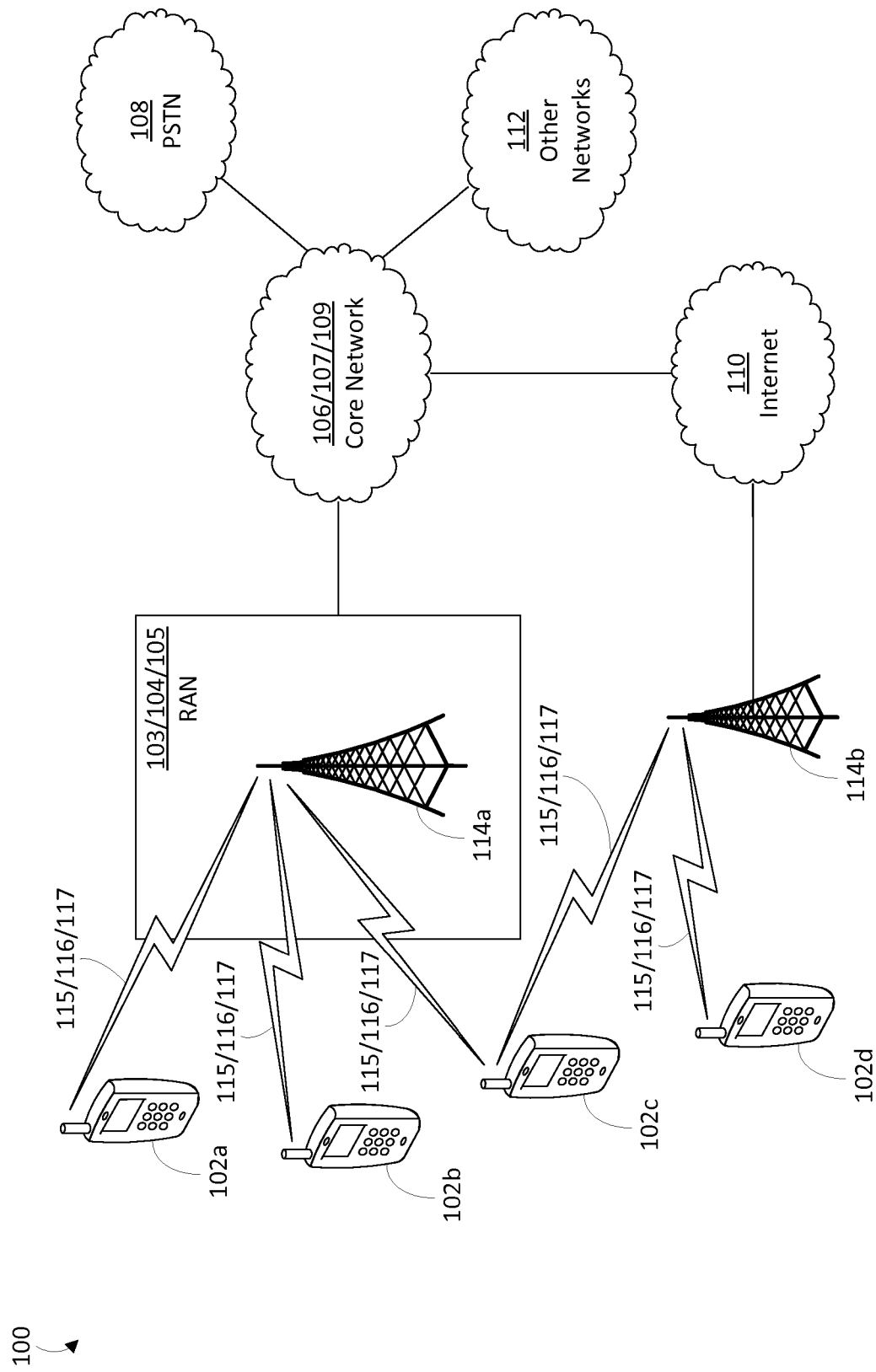
FIG. 1A depicts a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include wireless transmit/receive unit (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In an embodiment, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with a RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include a core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
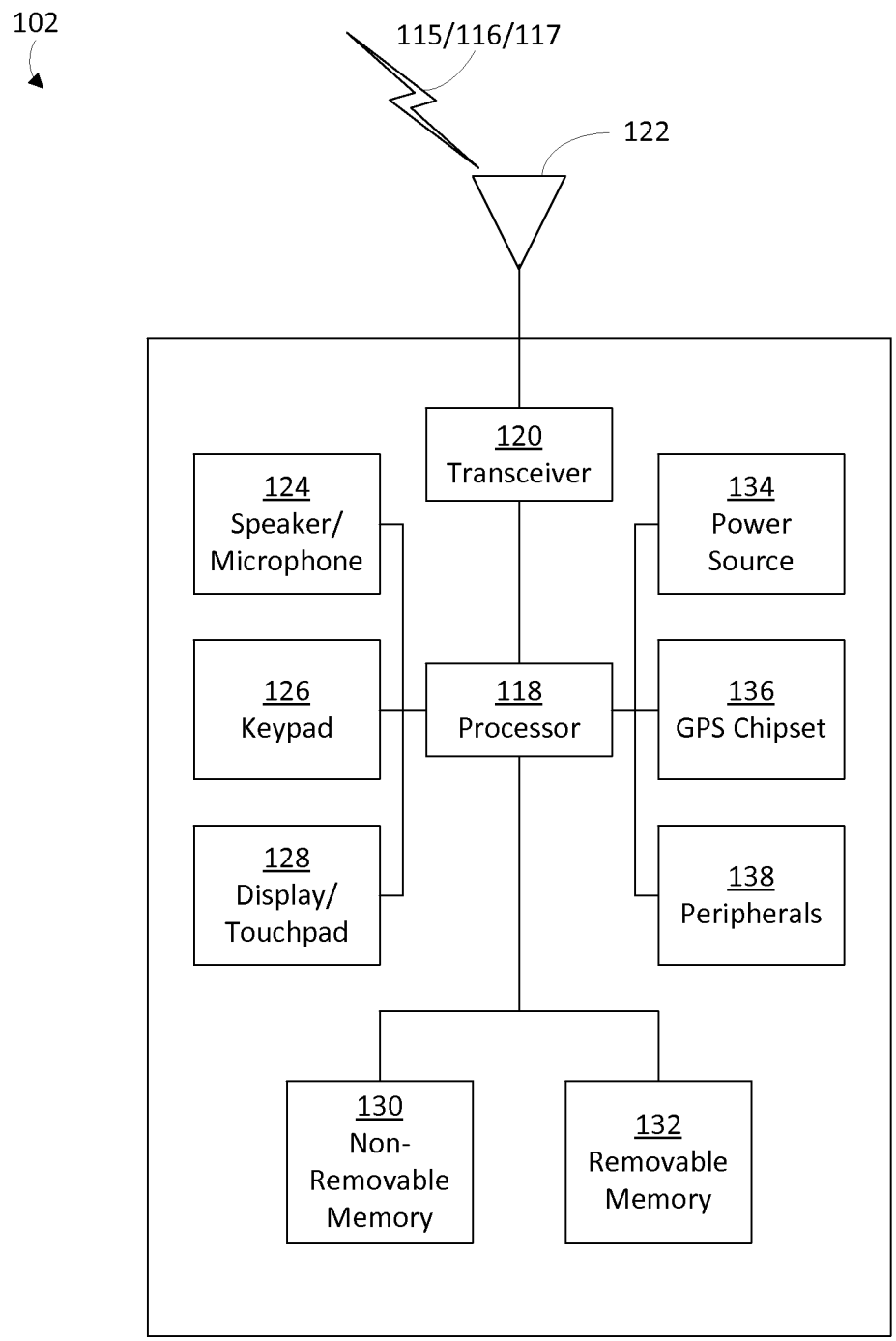
FIG. 1B depicts a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB or eNB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
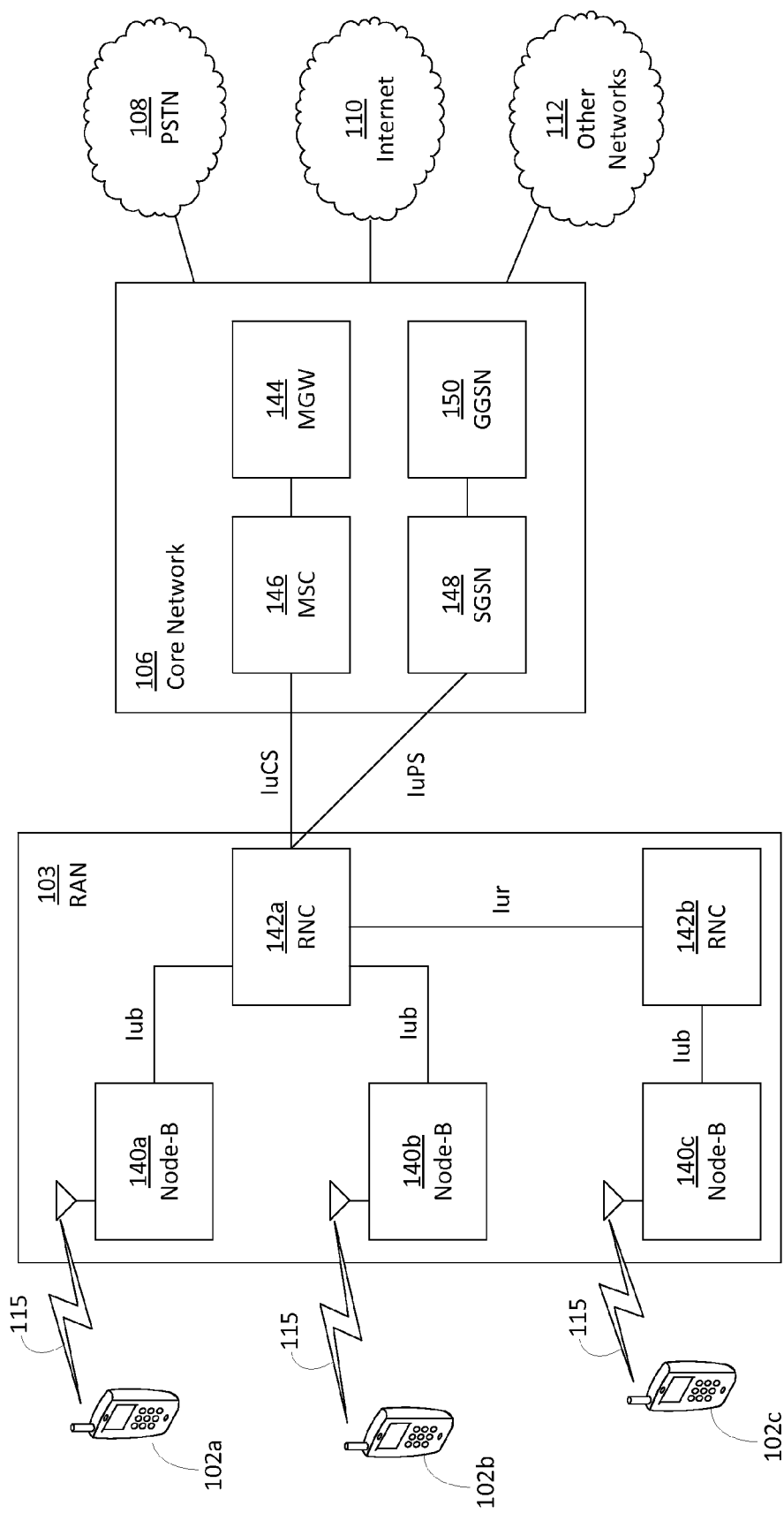
FIG. 1C depicts a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
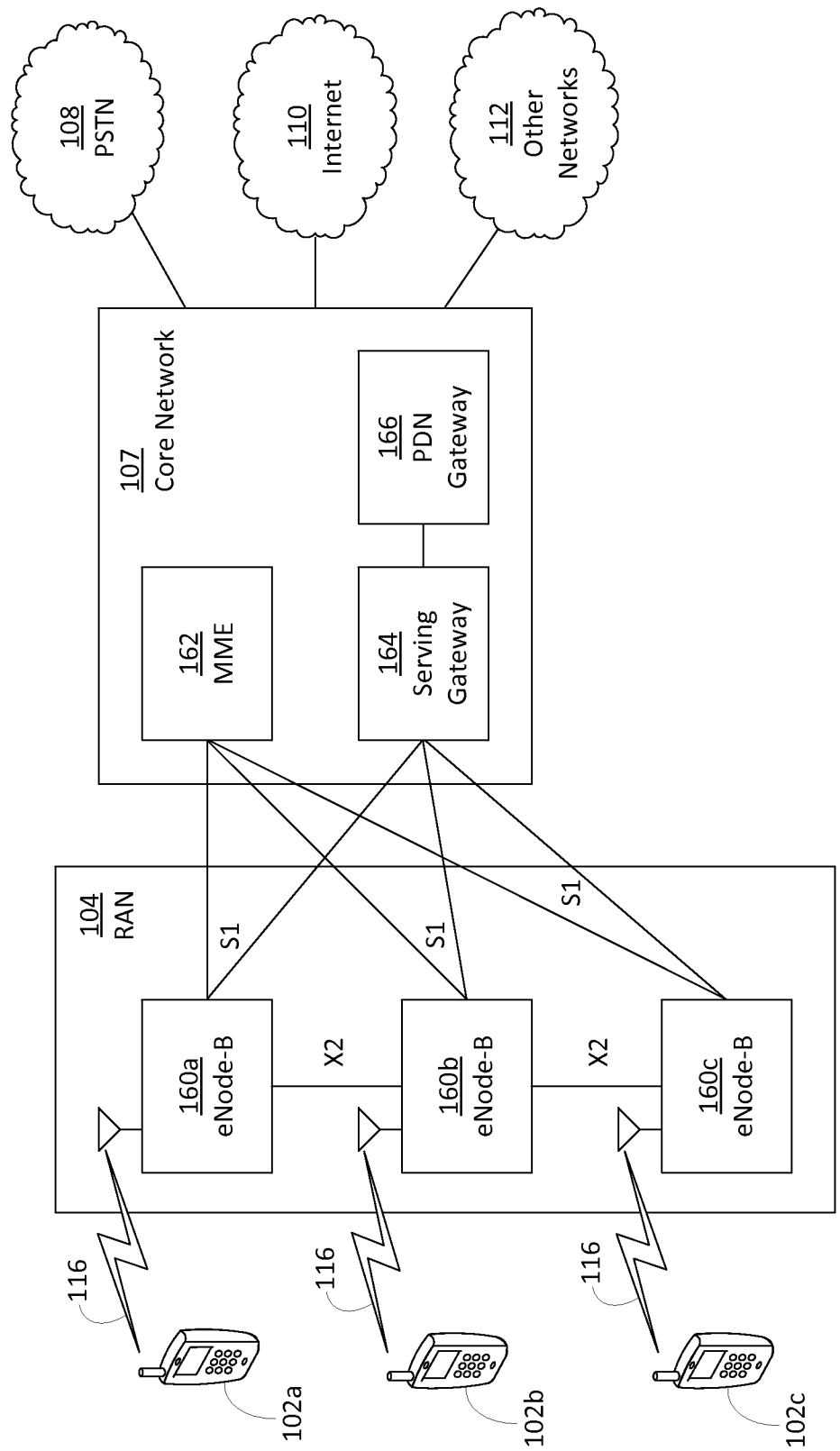
FIG. 1D depicts a system diagram of an example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
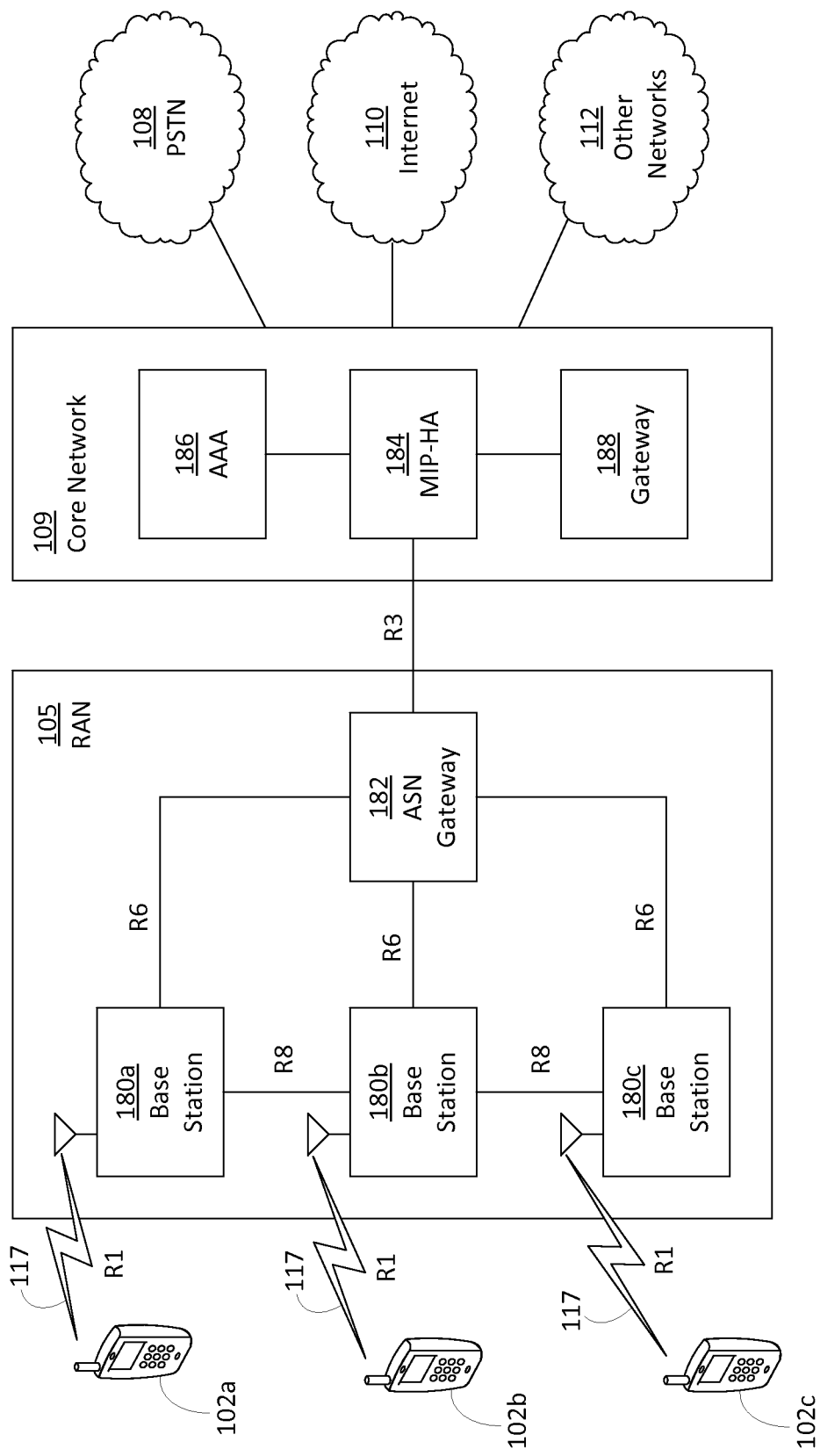
FIG. 1E depicts a system diagram of an example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Inter-cell interference management (e.g., mitigation) may be implemented in a communications system, for example using one or more of a relative narrowband transmit power (RNTP) indicator, a high interference indicator (HII), or interference overload indicator (OI) messages that may be sent over an X2 interface. One or more of these techniques may be implemented in a wireless communications system, such as an LTE or LTE-A communication system. In an example implementation, two or more neighboring eNBs may employ such messages to coordinate and/or reduce (e.g., minimize) interference (e.g., mutual interference) for downlink and/or uplink transmissions. Interference coordination may include the use of almost blank subframes (ABS). This technique may be implemented, for example, in a heterogeneous network (HetNet). In such a framework, a macro eNB may be prohibited from transmitting data in one or more ABS subframes, and one or more ABS subframes may be reserved. For example, one or more ABS subframes may be reserved for serving one or more UE's located in the cell range expansion (CRE) region of a picocell. The use (e.g., activation) of ABS may negatively impact the throughput of an associated macrocell. Reduced power ABS may be implemented, which may allow low power transmission of a physical downlink shared channel (PDSCH) by a macro eNB. Signaling support may be provisioned for one or more UEs (e.g., UEs associated with a picocell) to assist suppression and/or cancellation of interference, such as interference caused by one or more macrocell-specific or common reference symbols (CRS).

Advanced interference management schemes, such as interference alignment (IA), may be implemented and/or supported, for instance in a communications system, such as an LTE or LTE-A communication system. The introduction of one or more small cells (e.g., dense small cells) to a communications network (e.g., a 3GPP wireless network) may boost the network capacity and/or user throughput of the network, but may also introduce technical challenges. To illustrate, in a HetNet deployment in an LTE network, interference coordination across an associated macrocell and one or more small cells (e.g., picocells) of the network may be achieved using time domain multiplexing (TDM), for example using almost blank subframes. Other subframes may be used for low-power transmissions by a macrocell and one or more overlaid small cells (e.g., picocells) and/or remote radio heads (RRH).

In a communications system where coordination is not implemented across neighboring macrocells, one or more UEs that are located near (e.g., substantially at) the respective boundaries of two or more neighboring macrocells may suffer from performance loss. Such UEs may be referred to as boundary UEs. This performance loss may be due, for example, to one or more boundary UEs being limited by dominant interferers from one or more neighboring macrocells outside an associated serving macro and/or small cell cluster. To illustrate, performance loss in a communications system may be observed when one or more boundary UEs are associated with one or more small cells through biasing (e.g., UEs in the CRE area of one or more picocells and/or RRHs).

Resource partitioning in a HetNet may not be spectrally efficient for frequency reuse. A HetNet deployment may enhance frequency reuse of an operation of one or more associated macrocells by overlaying one or more smaller cells, such as picocells, femtocells, microcells, RRHs, or the like. To illustrate, in a HetNet deployment in LTE, interference coordination across a macrocell and one or more overlaid picocells may be achieved by, for example, implementing almost blank subframes.

In a communications system deployment using coordinated multipoint transmission (CoMP), the number of UEs that are co-scheduled may be limited by the respective degrees of freedom of one or more cooperating transmission points. For example, in a communications system using a coordinated scheduling and/or coordinated beam-forming (CS/CB) mode of operation, when a transmission point is equipped with multiple antennas (e.g., four transmit antennas), the transmission point may null the interference from up to three interferers, for example by using transmit zero-forcing beam-forming (ZF-BF). In another example, in a communications system using a joint transmission (JT) mode of operation, wherein multiple transmission points may be simultaneously transmitting to a single UE instead of interference nulling, the system may suffer from a loss of dimension that may have been used for scheduling multiple UEs.

A UE may be equipped with more than one antenna, but may nonetheless be limited with respect to interference mitigation. For example, if a UE is equipped with two receive antennas, the UE may not be able to mitigate interference from more than one interfering source (e.g., through receiver side processing). For such a UE, if the rank of the interference is greater than one, residual interference that may not have been suppressed by transmit beamforming may not be mitigated at the UE side. A UE, such as a UE with two receive antennas, may not attain an interference free subspace, without taking into account the operating signal-to-noise-ratio (SNR).

The performance of a UE in a communications system may be limited by multiple types of interference, for instance inter-cell interference and/or intra-cell interference. A UE may observe multiple interference types substantially concurrently. For example, in a communications system deployment using multi-user multiple multiple-input and multiple-output (MU-MIMO) antenna technology, the performance of a UE may be impacted by inter-cell interference (e.g., from a neighboring macrocell or small cell), and by intra-cell interference that may be caused, for example, by a co-scheduled UE (e.g., a UE using Multi-User MIMO) that may use the same time and frequency resources as the UE.

To illustrate, in a communications system deployment using MU-MIMO, a UE equipped with two receive antennas may perform interference mitigation (e.g., interference cancellation) on interference from a single source, such as intra-cell interference from a co-scheduled UE. Such a UE may be unable to mitigate the effect of interference from another source, for instance a dominant inter-cell interferer. In wireless communications systems (e.g., cellular systems), one or more UEs that are located close to a cell-center may be candidates that may be scheduled for MU-MIMO operation. One or more UEs that are located near respective cell edges (e.g., cell-edge UEs) may not be considered for MU-MIMO operation. Extending MU-MIMO operation to a large number of UEs in a cellular system (e.g., all UEs in the system) may further enhance the spectral efficiency in the cellular system. Enhanced spectral efficiency may be realized, for example, in a HetNet communications system, where the performance of the system may be limited by multi-layer interference.

Interference mitigation (e.g., interference suppression and/or interference cancellation) in a wireless communications system may include interference alignment techniques. A wireless communications system may be configured to concurrently mitigate the effects of multiple types of interference (e.g., inter-cell interference and intra-cell interference). Interference management (e.g., mitigation) using interference alignment may enhance spectral efficiency in an interference-limited communications system, such as a wireless communications system (e.g., a cellular system). Interference alignment techniques may be applied to a homogeneous wireless communications system (e.g., including one or macro base stations). Interference alignment techniques may be applied to a heterogeneous wireless communications system (e.g., including one or macro base stations and one or more overlaid low-power nodes, such as small cells, RRHs, or the like).

Figure 2:
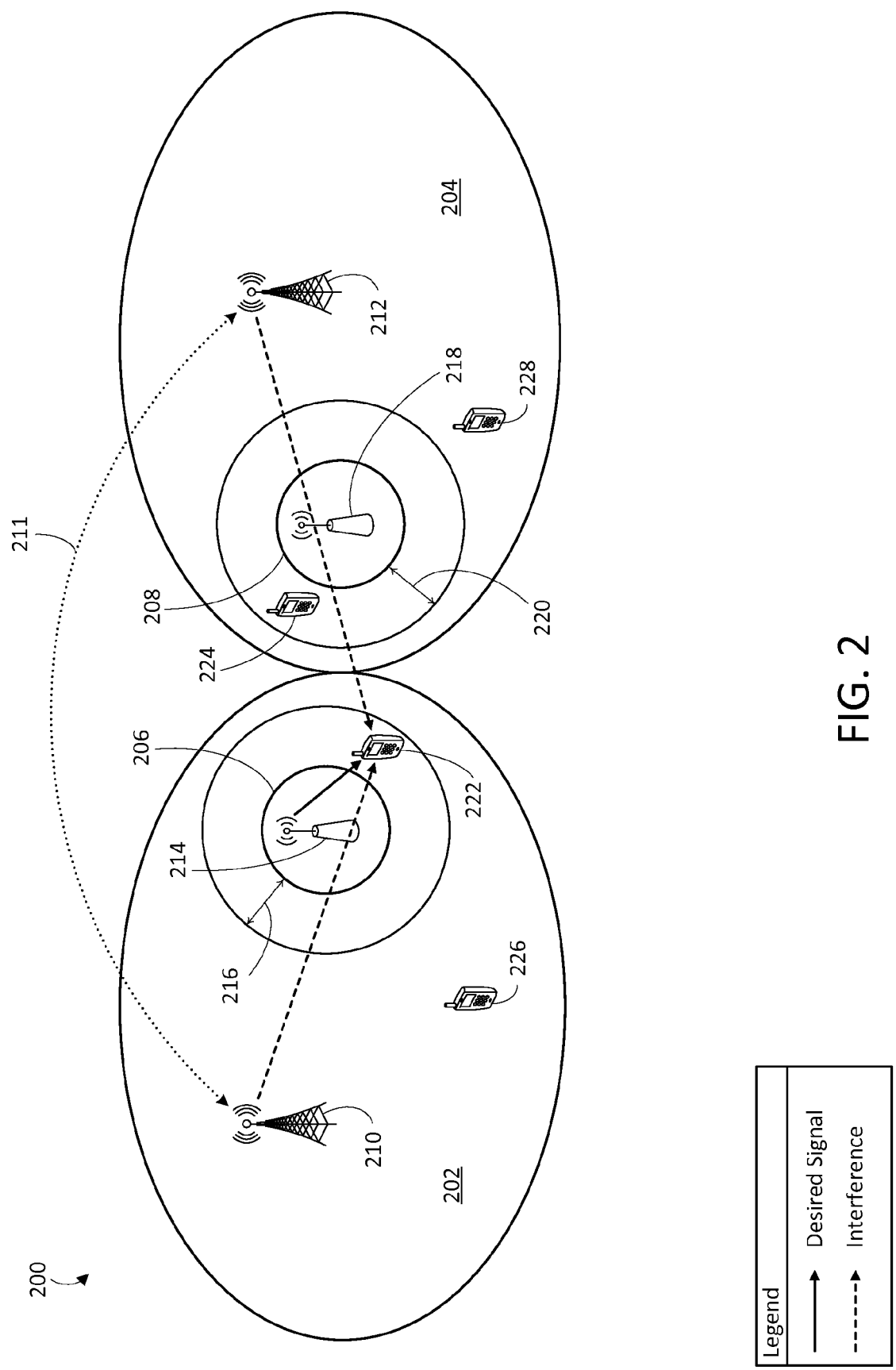
FIG. 2 depicts an example of inter-cell interference alignment that may be implemented in a wireless communications system.

FIG. 2 depicts an example wireless communications system 200. As shown, the wireless communications system 200 includes a first macrocell 202, a second macrocell 204 that neighbors the first macrocell 202, a first small cell 206 (e.g., a picocell) that overlays at least a portion of the first macrocell 202, and a second small cell 208 (e.g., a picocell) that overlays at least a portion of the second macrocell 204. The wireless communications system 200 may be referred to as a heterogeneous network (HetNet) deployment.

The first macrocell 202 includes a first base station 210 (e.g., an eNB), and the second macrocell 204 includes a second base station 212 (e.g., an eNB). The first base station 210 and the second base station 212 may communicate with each other via an interface 211 (e.g., an X2 interface). The first small cell 206 includes a first small cell base station 214 (e.g., an eNB). The first small cell 206 may define a corresponding cell range expansion (CRE) region 216. The second small cell 208 includes a second small cell base station 218 (e.g., an eNB). The second small cell 208 may define a corresponding CRE region 220. One or more of the first base station 210, the second base station 212, the first small cell base station 214, and the second small cell base station 218 may be configured to participate in interference alignment, for example as described herein.

The wireless communications system 200 may include one or more, such as a plurality of UEs that may be associated with various base stations of the wireless communications system 200. As shown, the wireless communications system 200 includes a plurality of UEs that includes a first UE 222 that is associated with the first small cell base station 214, a second UE 224 that is associated with the second small cell base station 218, a third UE 226 that is associated with the first base station 210, and a fourth UE 228 that is associated with the second base station 212. One or more of the first, second, third, and fourth UEs 222, 224, 226, 228, respectively, may be configured to participate in interference alignment, for example as described herein.

One or more of the UEs associated with the wireless communications system 200 may observe interference (e.g., inter-cell interference and/or intra-cell interference) during operation of the wireless communications system 200. Such interference may originate from one or more other devices in the wireless communications system 200. To illustrate, as shown the first UE 222, located in the CRE region 216, may be associated with the first small cell base station 214. The first UE 222 may receive one or more desired signals from the first small cell base station 214. The first small cell base station 214 may be referred to as a first transmission point in the wireless communications system 200. The first UE 222 may observe interference originating from the first base station 210 and/or from the second base station 212, which may be referred to as second and third transmission points, respectively, in the wireless communications system 200. The interference may interfere with reception by the first UE 222 of one or more desired signals from the first small cell base station 214.

Interference may be observed, for example, when the first base station 210 serves the third UE 226 and/or when the second base station 212 serves the fourth UE 228. Using an implementation of interference alignment, interference originating from the first base station 210 and/or the second base station 212 may be aligned, such that interference signals from both the first and second base stations 210, 212, respectively, may occupy a signal subspace that is different from a signal subspace occupied by one or more desired signals for the first UE 222. At the first UE 222, a subspace of the aggregate observed interference may be of a smaller dimension than a corresponding number of interferers. Performance of interference alignment may enhance the capability of a receiver of the first UE 222 to perform interference mitigation. The performance of interference alignment may improve coverage of the first small cell 206, and/or may enable more frequent offload opportunities, for example from one or both of the first and second base stations 210, 212, to one or both of the first and second small cells 206, 208. The performance of interference alignment may improve an operating signal to interference ratio SIR, such that higher throughput and/or an enhanced user experience may be achieved.

If the first UE 222 has a limited number of antennas (e.g., two antennas), the first UE 222, if not implemented with interference alignment, may not be able to cancel interference from multiple transmission points, for example interference originating from the first and second base stations 210, 212. By performing interference alignment, such interference may be aligned in a smaller dimension (e.g., in one dimension instead of two dimensions). Interference alignment may enable the first UE 222 to attain an interference free direction, such that a receiver of the first UE 222 may use an interference cancellation technique (e g , minimum mean square error (MMSE)) in the interference free direction to cancel multiple dominant interfering signals (e.g., from the first and second base stations 210, 212).

In accordance with an example implementation of interference alignment, the first UE 222 may be configured to perform an interference alignment process. The first UE 222 may perform measurements (e.g., spatial measurements) on interference observed at the first UE 222 (e.g., one or more transmissions received at the first UE 222). The interference may originate, for example, from the first and second base stations 210, 212. The first UE 222 may perform separate interference measurements (e.g., respective measurements of separate signals received from the first and second base stations 210, 212) or an aggregated interference measurement (e.g., of interference from both the first and second base stations 210, 212). The first UE 222 may estimate, based on one or more interference measurements, an interference subspace that is related to the first UE 222. The first UE 222 may quantize the one or more interference measurements. For example, the first UE 222 may quantize the estimated interference subspace into a quantization subspace.

The first UE 222 may be configured to report information pertaining to one or more interference measurements performed by the first UE 222. For example, the first UE 222 may send a feedback report. The feedback report may include, for example, an estimate of aggregate spatial interference observed at the first UE 222, one or more estimates of individual spatial interferences observed at the first UE 222, a quantization subspace, or the like. The first UE 222 may be configured to send the feedback report to one or more other devices in the wireless communications system 200. For example, the first UE 222 may be configured to send the feedback report to the first small cell base station 214. The first small cell base station 214 may be configured to forward the feedback report to one or more other devices in the wireless communications system 200, such as the first and second base stations 210, 212.

The first and second base stations 210, 212 may be configured to coordinate precoding with each other (e.g., via an X2 interface) in accordance with information in the feedback report, such that interfering signals from the first and/or second base stations 210, 212 are aligned in an unwanted receive subspace of the first UE 222 (e.g., aligned in accordance with the quantization subspace).

The first UE 222 may be configured to perform interference mitigation (e.g., interference suppression and/or interference cancellation) on one or more interfering signals observed at the first UE 222 (e.g., interfering signals originating from the first and second base stations 210, 212). The first UE 222 may perform such interference mitigation at a receiver of the first UE 222, on interfering signals that are aligned in the quantization subspace. It should be appreciated that interference alignment process may be performed on behalf of multiple UEs in the wireless communications system 200, and that respective alignment processes for multiple UEs may be performed substantially concurrently.

Figure 3:
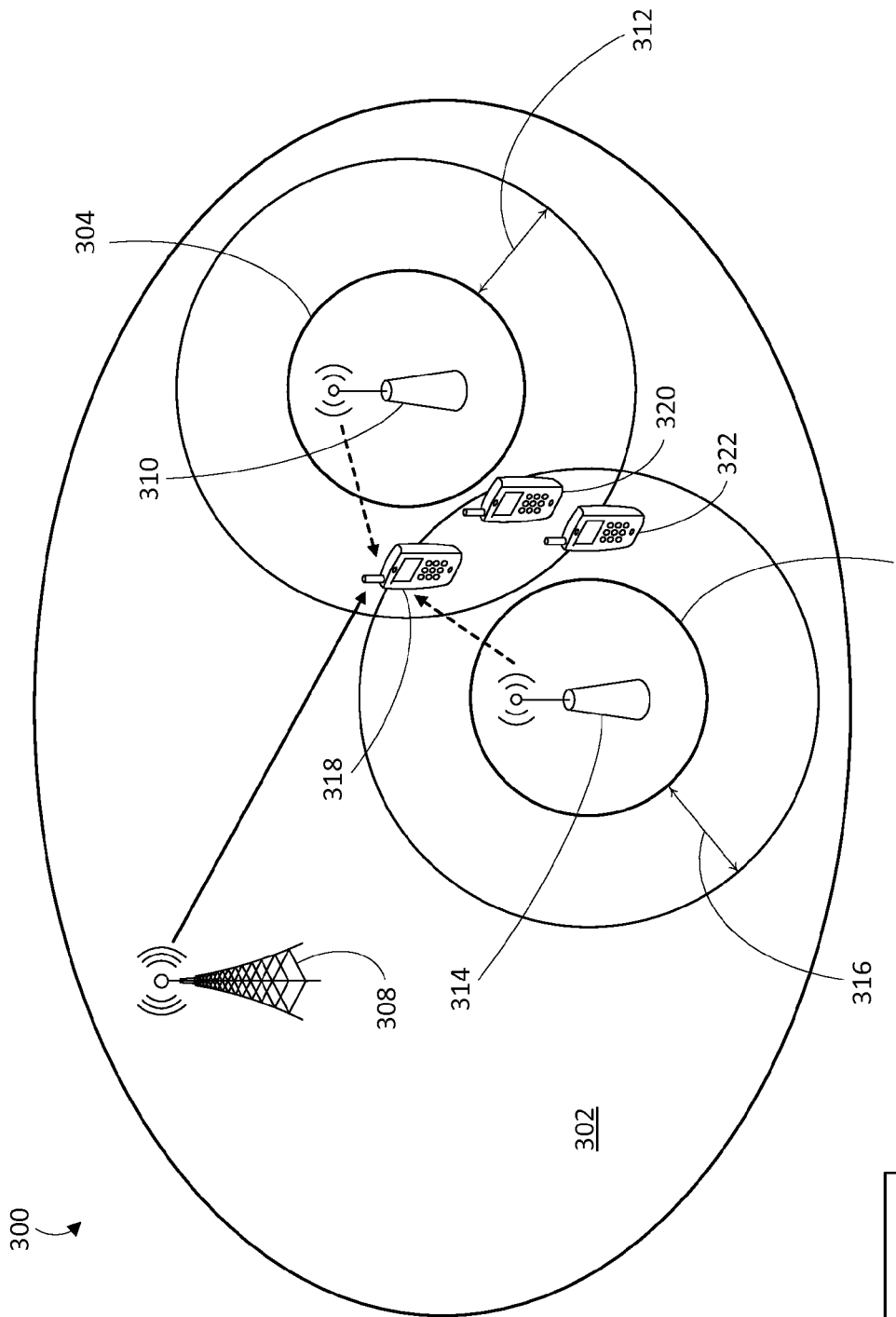
FIG. 3 depicts an example of intra-cell interference alignment that may be implemented in a wireless communications system.

FIG. 3 depicts an example wireless communications system 300. As shown, the wireless communications system 300 includes a macrocell 302, a first small cell 304 (e.g., a picocell) that overlays at least a portion of the macrocell 302, and a second small cell 306 (e.g., a picocell) that overlays at least a portion of the macrocell 302. The wireless communications system 300 may be referred to as a heterogeneous network (HetNet) deployment.

The macrocell 302 includes a base station 308 (e.g., an eNB). The first small cell 304 includes a first small cell base station 310 (e.g., an eNB). The first small cell 304 may define a corresponding cell range expansion (CRE) region 312. The second small cell 306 includes a second small cell base station 314 (e.g., an eNB). The second small cell 306 may define a corresponding CRE region 316. As shown, the CRE region 312 of the first small cell 304 and the CRE region 316 of the second small cell 306 may at least partially overlap each other. One or more of the base station 308, the first small cell base station 310, and the second small cell base station 314 may be configured to participate in interference alignment, for example as described herein.

The wireless communications system 300 may include one or more, such as a plurality of UEs that may be associated with various base stations of the wireless communications system 300. As shown, the wireless communications system 300 includes a plurality of UEs that includes a first UE 318 that is associated with the base station 308, a second UE 320 that is associated with the first small cell base station 310, and a third UE 322 that is associated with the second small cell base station 314. One or more of the first, second, and third UEs 318, 320, 322, respectively, may be configured to participate in interference alignment, for example as described herein.

One or more of the UEs associated with the wireless communications system 300 may observe interference (e.g., intra-cell interference) during operation of the wireless communications system 300. Such interference may originate from one or more other devices in the wireless communications system 300. For example, the first UE 318 may observe interference originating from one or both of the first and second small cell base stations 310, 314. The second UE 320 may observe interference originating from one or both of the base station 308 and the second small cell base station 314. The third UE 322 may observe interference originating from one or both of the base station 308 and the first small cell base station 310. If a UE is operating in a location where the CRE region 312 of the first small cell 304 and the CRE region 316 of the second small cell 306 overlap each other, the received signal powers from the macrocell 302 and/or one or more neighboring small cells (e.g., the first small cell 304 and/or the second small cell 306) may be stronger than the received signal power of serving cell that the UE is associated with.

One or more of the base station 308, the first small cell base station 310, and the second small cell base station 314 may be configured to perform interference management for the wireless communications system 300. For example, respective interfering signals from the first and second small cell base stations 310, 314 to a UE that is associated with the base station 308 (e.g., the first UE 318) may be aligned in a common signal subspace. In another example, respective interfering signals from the base station 308 and/or the first or second small cell base stations 310, 314 to a UE that is associated with the other of the first or second small cell base stations 310, 314 (e.g., the second or third UEs 320, 322) may be aligned in a common signal subspace. These common signal subspaces may have smaller dimensions than the associated number of interferers.

In an example of interference that may be observed during operation of the wireless communications system 300, the first UE 318 may receive one or more desired signals from the base station 308. The base station 308 may be referred to as a first transmission point in the wireless communications system 300. The first UE 318 may observe interference originating from the first small cell base station 310 and/or from the second small cell base station 314, which may be referred to as second and third transmission points, respectively, in the wireless communications system 300. The interference may interfere with reception by the first UE 318 of one or more desired signals from the base station 308.

In accordance with an example implementation of interference alignment, the first UE 318 may be configured to perform an interference alignment process. The first UE 318 may perform measurements (e.g., spatial measurements) on interference observed at the first UE 318 (e.g., one or more transmissions received at the first UE 318). The interference may originate, for example, from the first and second small cell base stations 310, 314. The first UE 318 may perform separate interference measurements (e.g., respective measurements of separate signals received from the first and second small cell base stations 310, 314) or an aggregated interference measurement (e.g., of interference from both the first and second small cell base stations 310, 314). The first UE 318 may estimate, based on one or more interference measurements, an interference subspace that is related to the first UE 318. The first UE 318 may quantize the one or more interference measurements. For example, the first UE 318 may quantize the estimated interference subspace into a quantization subspace.

The first UE 318 may be configured to report information pertaining to one or more interference measurements performed by the first UE 318. For example, the first UE 318 may send a feedback report. The feedback report may include, for example, an estimate of aggregate spatial interference observed at the first UE 318, one or more estimates of individual spatial interferences observed at the first UE 318, a quantization subspace, or the like. The first UE 318 may be configured to send the feedback report to one or more other devices in the wireless communications system 300. For example, the first UE 318 may be configured to send the feedback report to the base station 308. The base station 308 may be configured to forward the feedback report (e.g., via an X2 interface) to one or more other devices in the wireless communications system 300, such as the first and second small cell base stations 310, 314.

The first and second small cell base stations 310, 314 may be configured to coordinate precoding with each other in accordance with information in the feedback report, such that interfering signals from the first and/or second small cell base stations 310, 314 are aligned in an unwanted receive subspace of the first UE 318 (e.g., aligned in accordance with the quantization subspace).

The first UE 318 may be configured to perform interference mitigation (e.g., interference suppression and/or interference cancellation) on one or more interfering signals observed at the first UE 318 (e.g., interfering signals originating from the first and second small cell base stations 310, 314). The first UE 318 may perform such interference mitigation at a receiver of the first UE 222, on interfering signals that are aligned in the quantization subspace. It should be appreciated that interference alignment process may be performed on behalf of multiple UEs in the wireless communications system 300, and that respective alignment processes for multiple UEs may be performed substantially concurrently.

Figure 4:
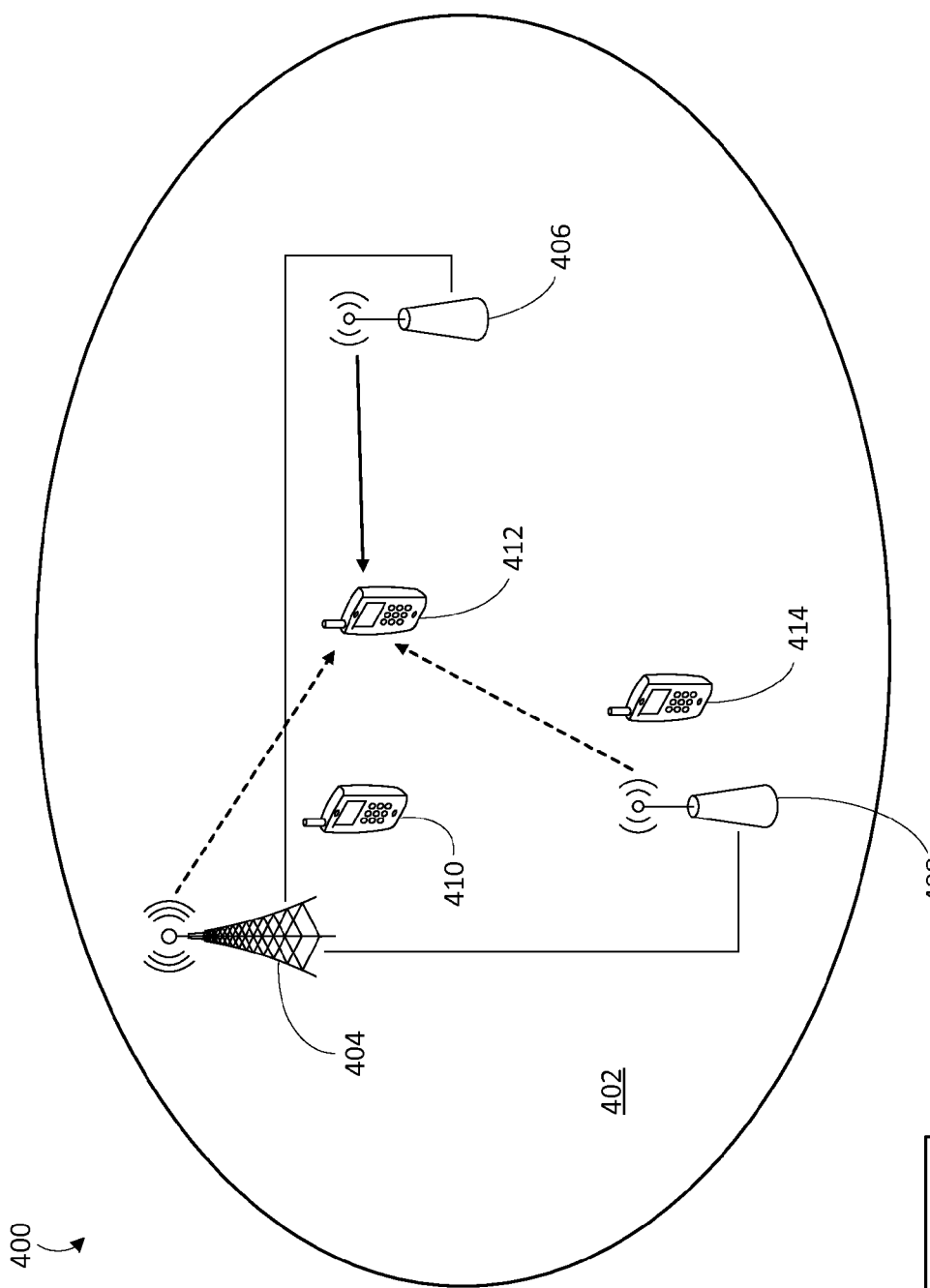
FIG. 4 depicts an example of intra-cell interference alignment that may be implemented in a wireless communications system that employs coordinated multipoint (CoMP) transmission.

FIG. 4 depicts an example wireless communications system 400 that may be configured for CoMP communication. As shown, the wireless communications system 400 includes a macrocell 402. The macrocell 402 includes a base station 404 (e.g., an eNB), a first distributed antenna 406 (e.g., an RRH), and a second distributed antenna 408 (e.g., an RRH). The wireless communications system 400 may be referred to as a heterogeneous network (HetNet) deployment. One or more of the base station 404, the first distributed antenna 406, and the second distributed antenna 408 may be configured to participate in interference alignment, for example as described herein.

The wireless communications system 400 may include one or more, such as a plurality of UEs that may be associated with various components of the wireless communications system 400. As shown, the wireless communications system 400 includes a plurality of UEs that includes a first UE 410 that is associated with the base station 404, a second UE 412 that is associated with the first distributed antenna 406, and a third UE 414 that is associated with the second distributed antenna 408. One or more of the first, second, and third UEs 410, 412, 414, respectively, may be configured to participate in interference alignment, for example as described herein.

One or more of the UEs associated with the wireless communications system 400 may observe interference (e.g., intra-cell interference) during operation of the wireless communications system 400. Such interference may originate from one or more other devices in the wireless communications system 400. For example, the first UE 410 may observe interference origination from one or both of the first and second distributed antennas 406, 408. The second UE 412 may observe interference originating from one or both of the base station 404 and the second distributed antenna 408. The third UE 414 may observe interference originating from one or both of the base station 404 and the first distributed antenna 406.

One or more of the base station 404, the first distributed antenna 406, and the second distributed antenna 408 may be configured to perform interference management for the wireless communications system 400. For example, respective interfering signals from the base station 404 and/or the first or second distributed antennas 406, 408 to a UE that is associated with the other of the first or second distributed antennas 406, 408 (e.g., the second or third UEs 412, 414) may be aligned in a common signal subspace. In another example, respective interfering signals from the first and second distributed antennas 406, 408 to a UE that is associated with the base station 404 (e.g., the first UE 410) may be aligned in a common signal subspace. These common signal subspaces may have smaller dimensions than the associated number of interferers.

In an example of interference that may be observed during operation of the wireless communications system 400, the second UE 412 may receive one or more desired signals from the first distributed antenna 406. The first distributed antenna 406 may be referred to as a first transmission point in the wireless communications system 400. The second UE 412 may observe interference originating from the base station 404 and/or from the second distributed antenna 408, which may be referred to as second and third transmission points, respectively, in the wireless communications system 400. The interference may interfere with reception by the second UE 412 of one or more desired signals from the first distributed antenna 406.

In accordance with an example implementation of interference alignment, the second UE 412 may be configured to perform an interference alignment process. The second UE 412 may perform measurements (e.g., spatial measurements) on interference observed at the second UE 412 (e.g., one or more transmissions received at the second UE 412). The interference may originate, for example, from the base station 404 and the second distributed antenna 408. The second UE 412 may perform separate interference measurements (e.g., respective measurements of separate signals received from the base station 404 and the second distributed antenna 408) or an aggregated interference measurement (e.g., of interference from both the base station 404 and the second distributed antenna 408). The second UE 412 may estimate, based on one or more interference measurements, an interference subspace that is related to the second UE 412. The second UE 412 may quantize the one or more interference measurements. For example, the second UE 412 may quantize the estimated interference subspace into a quantization subspace.

The second UE 412 may be configured to report information pertaining to one or more interference measurements performed by the second UE 412. For example, the second UE 412 may send a feedback report. The feedback report may include, for example, an estimate of aggregate spatial interference observed at the second UE 412, one or more estimates of individual spatial interferences observed at the second UE 412, a quantization subspace, or the like. The second UE 412 may be configured to send the feedback report to one or more other devices in the wireless communications system 400. For example, the second UE 412 may be configured to send the feedback report to the base station 404.

The base station 404 may be configured to coordinate precoding at the base station 404 and the second distributed antenna 408 in accordance with information in the feedback report, such that interfering signals from the base station 404 and the second distributed antenna 408 are aligned in an unwanted receive subspace of the second UE 412 (e.g., aligned in accordance with the quantization subspace).

The second UE 412 may be configured to perform interference mitigation (e.g., interference suppression and/or interference cancellation) on one or more interfering signals observed at the second UE 412 (e.g., interfering signals originating from the base station 404 and the second distributed antenna 408). The second UE 412 may perform such interference mitigation at a receiver of the second UE 412, on interfering signals that are aligned in the quantization subspace. It should be appreciated that interference alignment process may be performed on behalf of multiple UEs in the wireless communications system 400, and that respective alignment processes for multiple UEs may be performed substantially concurrently.

Figure 5:
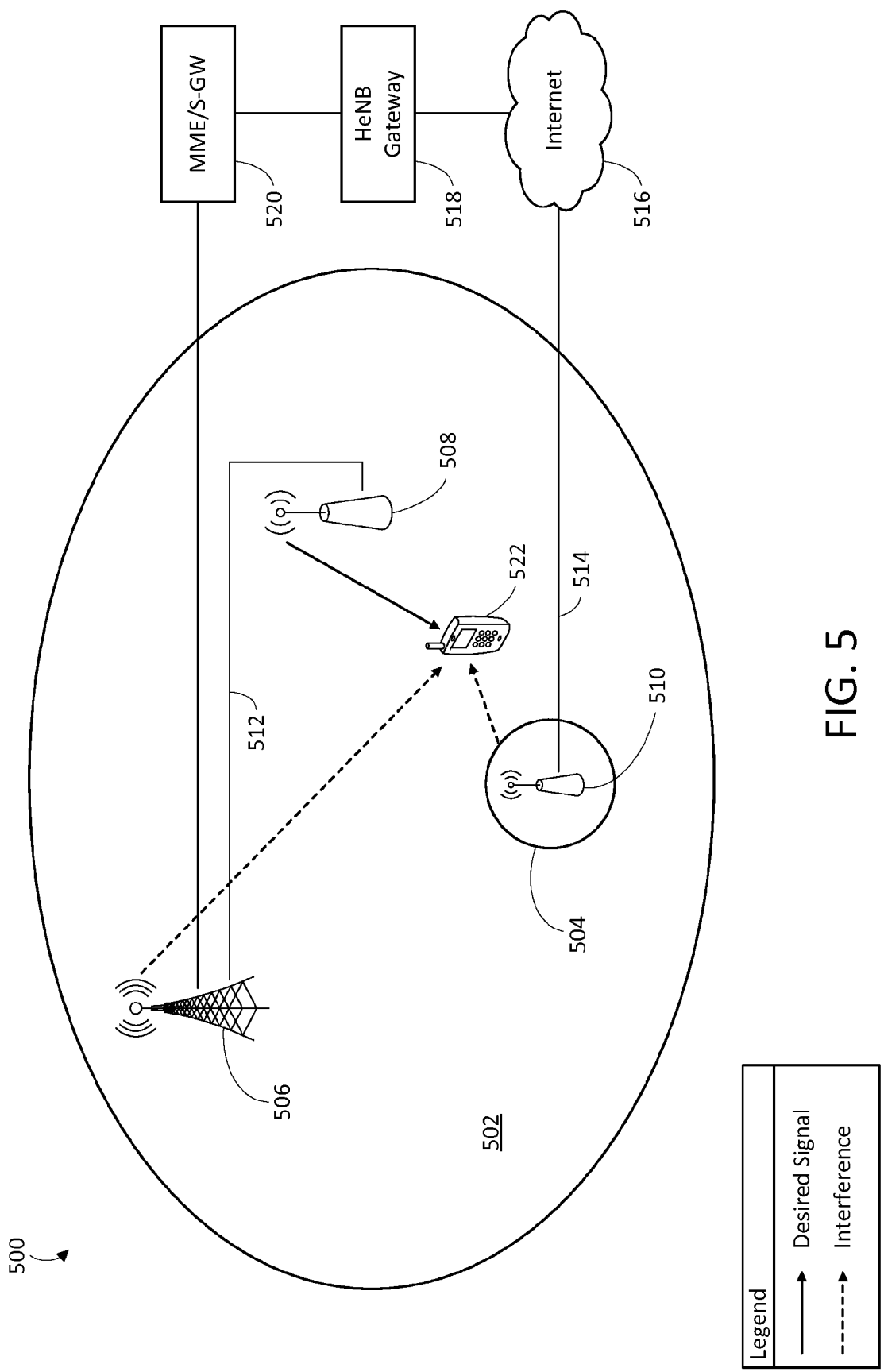
FIG. 5 depicts an example of interference alignment that may be implemented in a wireless communications system that employs cell layers with differing transmission characteristics and/or backhaul connections.

A wireless communications system deployment topology with multiple cell layers may have one or more transmission characteristics and/or backhaul connections. FIG. 5 depicts an example wireless communications system 500. As shown, the wireless communications system 500 includes a macrocell 502 and a small cell 504 (e.g., a femtocell) that overlays at least a portion of the macrocell 502. The macrocell 502 includes a base station 506 (e.g., an eNB) and a distributed antenna 508 (e.g., an RRH). The small cell 504 includes a small cell base station 510 (e.g., an eNB). The wireless communications system 500 may be referred to as a heterogeneous network (HetNet) deployment. One or more of the base station 506, the distributed antenna 508, and the small cell base station 510 may be configured to participate in interference alignment, for example as described herein.

The distributed antenna 508 may be connected (e.g., directly) to the base station 506, for example via a link 512 (e.g., a high quality radio on fiber (ROF) link). The small cell base station 510 of the small cell 504 may be recognized (e.g., by the base station 506) as a home eNodeB, may be user configured, and may connected to the core network through a connection 514 (e.g., an IP connection). In an example, the connection 514 between the small cell base station 510 and the base station 506 may traverse one or more devices, such as the Internet 516, an HeNB gateway 518, and/or an MME/serving gateway (S-GW) 520.

The wireless communications system 500 may include one or more, such as a plurality of UEs that may be associated with various components of the wireless communications system 500. As shown, the wireless communications system 500 includes a UE 522 that is associated with the distributed antenna 508. The UE 522 may be configured to participate in interference alignment, for example as described herein.

One or more of the UEs associated with the wireless communications system 500 may observe interference during operation of the wireless communications system 500. Such interference may originate from one or more other devices in the wireless communications system 500. For example, the UE 522 may observe interference from one or both of the base station 506 and the small cell base station 510.

The base station 506 and the distributed antenna 508 may be configured to perform interference management for the wireless communications system 500, for example without participation by the small cell base station 510. For example, respective interfering signals from the base station 506 and/or the small cell base station 510 to the UE 522 may be aligned in a common signal subspace. The common signal subspace may have smaller dimensions than the associated number of interferers.

In an example of interference that may be observed during operation of the wireless communications system 500, the UE 522 may receive one or more desired signals from the distributed antenna 508. The distributed antenna 508 may be referred to as a first transmission point in the wireless communications system 500. The UE 522 may observe interference originating from the base station 506 and/or from the small cell base station 510, which may be referred to as second and third transmission points, respectively, in the wireless communications system 500. The interference may interfere with reception by the UE 522 of one or more desired signals from the distributed antenna 508.

In accordance with an example implementation of interference alignment, the UE 522 may be configured to perform an interference alignment process. The UE 522 may make one or more interference measurements, and may determine that the base station 506 and the small cell base station 510 may be dominant sources of interference. The UE 522 may perform measurements (e.g., spatial measurements) on interference observed at the UE 522 (e.g., one or more transmissions received at the UE 522). The interference may originate, for example, from the base station 506 and the small cell base station 510. The UE 522 may perform separate interference measurements (e.g., respective measurements of separate signals received from the base station 506 and the small cell base station 510) or an aggregated interference measurement (e.g., of interference from both the base station 506 and the small cell base station 510). For example, the UE 522 may perform channel state information (CSI) measurements on a link between the UE 522 and the base station 506, and/or on a link between the UE 522 and the small cell base station 510. The UE 522 may compute, based on the CSI measurements, respective CSI matrices from the UE 522 to the base station 506, the distributed antenna 508, and/or the small cell base station 510.

The UE 522 may calculate a receiver weight vector, based on the CSI matrix to the small cell base station 510. The weight vector may be designed to improve (e.g., optimize) the performance of interference suppression of interfering signals originating from the small cell base station 510. A null vector may be used for the weight vector. Such a null vector may be orthogonal, for example, to the CSI matrix to the small cell base station 510.

The UE 522 may be configured to report information pertaining to one or more interference measurements (e.g., CSI measurements) performed by the UE 522. For example, the UE 522 may send a feedback report. The feedback report may include, for example, the weight vector, the CSI matrix to the base station 506, and/or the CSI matrix to the distributed antenna 508. The UE 522 may be configured to send the feedback report to one or more other devices in the wireless communications system 500. For example, the UE 522 may be configured to send the feedback report to respective schedulers of the base station 506 and the distributed antenna 508. The UE 522 may be configured to combine the weight vector with the CSI matrices in the feedback report, which may reduce signaling overhead.

Based on information in the feedback report, a scheduler of the base station 506 may be configured to determine a precoding vector that may be used to align interfering signals originating from the base station 506 and observed at the UE 522, with interfering signals originating from the small cell base station 510 and observed at the UE 522. This precoding vector may be applied, for example, if the base station 506 is aware that the distributed antenna 508 is scheduling data to the UE 522 in a common subframe. A scheduler of the distributed antenna 508 may determine a precoding function based on the feedback report, such that one or more desired signals transmitted to the UE 522 are enhanced (e.g., optimized).

The UE 522 may be configured to perform interference mitigation (e.g., interference suppression and/or interference cancellation) on one or more interfering signals observed at the UE 522 (e.g., interfering signals originating from the base station 506 and the distributed antenna 508). The UE 522 may perform such interference mitigation at a receiver of the UE 522, on interfering signals that are aligned with respect to each other (e.g., in accordance with respective operations of the base station 506 and the distributed antenna 508). It should be appreciated that interference alignment process may be performed on behalf of multiple UEs in the wireless communications system 500, and that respective alignment processes for multiple UEs may be performed substantially concurrently.

Figure 6:
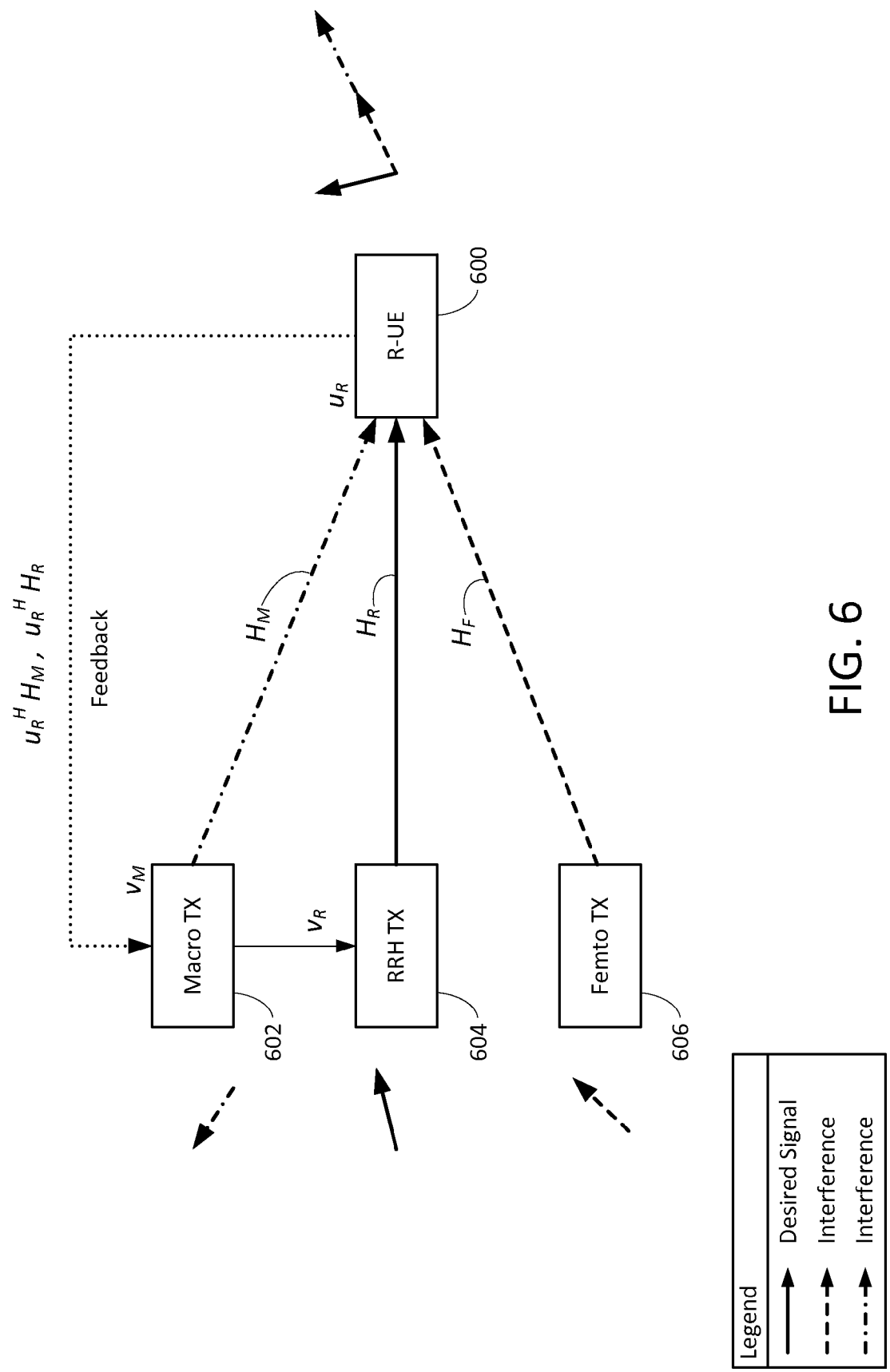
FIG. 6 illustrates an example interference alignment solution that may be implemented in a wireless communications system.

FIG. 6 depicts a system model of an example interference alignment implementation. As shown, $H_M$, $H_R$, and $H_F$ may be representative of respective CSI matrices that may be computed based on one or signal measurements performed by a UE 600. In accordance with the illustrated example, the CSI matrix $H_M$ may be associated with a macrocell base station 602 (e.g., an eNB), the CSI matrix $H_R$ be associated with a distributed antenna 604 (e.g., an RRH) towards, and the CSI matrix $H_F$ may be associated with a small cell base station 606 (e.g., of a femtocell). The UE 600 may provide feedback to the base station 602. The feedback may include a receiver weight vector $u_R$. Precoding vectors $v_M$ and $v_R$ may be determined by the base station 602 and the distributed antenna 604, respectively. The receiver weight vector at the UE may be designated such that:

$$u_R^H H_F = 0 \tag{1}$$

This may enable enhanced (e.g., maximized) interference suppression, as interference originating from the small cell base station 606 may be zeroed out.

The UE 600 may provide vectors $u_R^H H_M$ and $u_R^H H_R$, which may represent feedback, to respective schedulers for the base station 602 and the distributed antenna 604. The schedulers may be collocated, for example at a common central processing unit. The schedulers may use this feedback to calculate respective precoding vectors, for example using a zero forcing algorithm, such as:

$$[v_0 \quad v_1] = \begin{bmatrix} u_R^H H_R \\ u_R^H H_M \end{bmatrix}^{-1} \tag{2}$$

If $v_R = v_0$ and $v_M = v_0$, equation (2) may provide $u_R^H H_R v_R = 1$ and $u_R^H H_M v_M = 0$, which may imply that interference from the base station 602 may be aligned with interference from the small cell base station 606. This may assume that the desired signal is preserved.

If the received signal at the UE is denoted by $y_R$, the desired signal and interference may be in accordance with:

$$y_R = H_R v_R s_R + H_M v_M s_M + H_F s_F + n \tag{3}$$

where $s_R$, $s_M$, and $s_F$ may be transmitted symbols from the distributed antenna 604, the base station 602, and the small cell base station 606, respectively. In equation (3), n may represent a noise term.

After the processing by the receiver weight vector at the UE, a resulting signal may be in accordance with:

$$\hat{s}_R = u_R^H y_R = s_R + u_R^H n \tag{4}$$

such that interference originating from the small cell base station 606 and the base station 602 may be suppressed.

It should be appreciated that implementation of interference alignment in a wireless communications system is not limited to illustrated example including the base station 602, the distributed antenna 604, and the small cell base station 606, and that interference alignment may be implemented in accordance with communications system models having more, fewer, or different transmission points and/or UEs.

Figure 7:
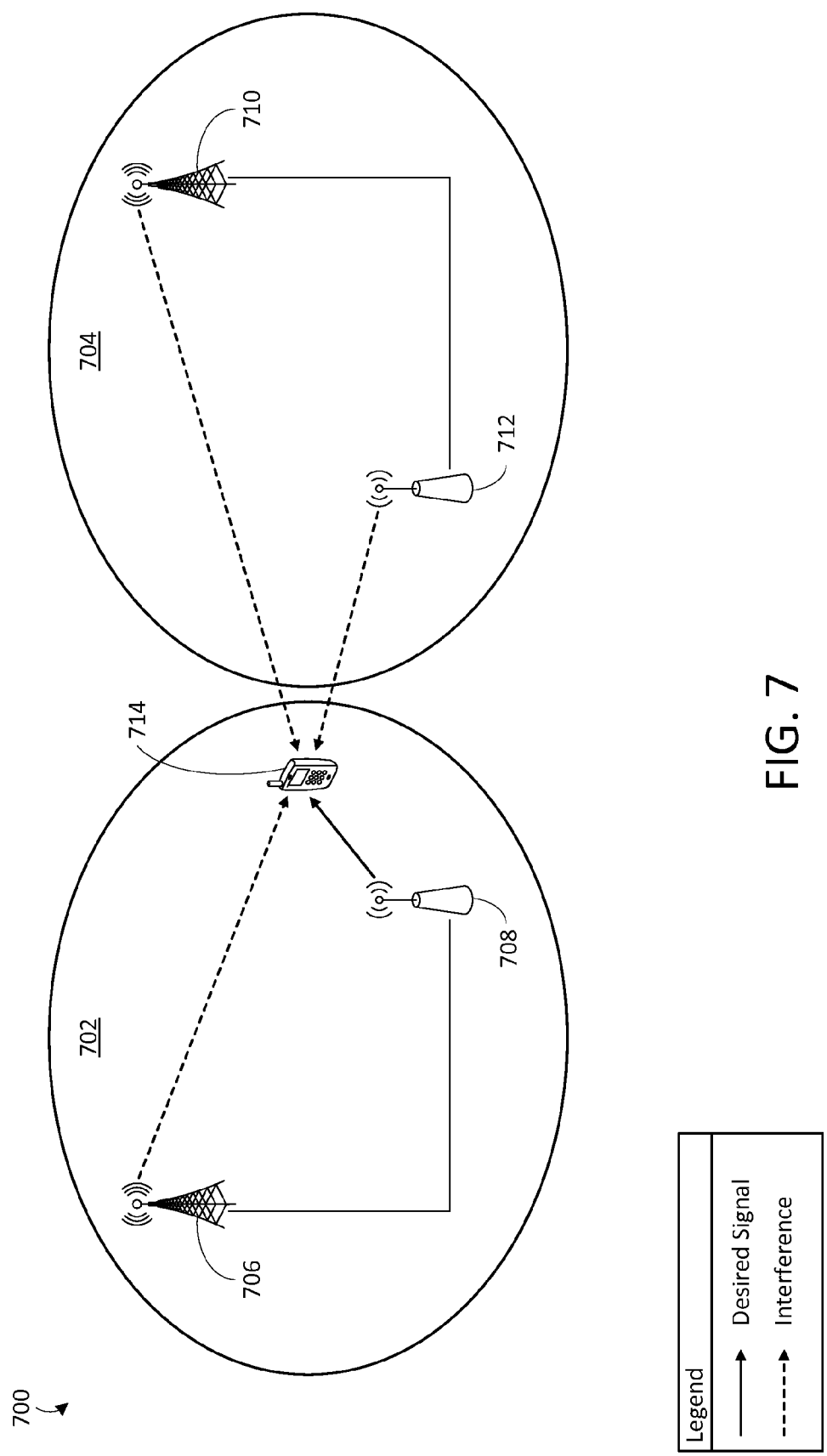
FIG. 7 depicts an example of interference alignment that may be implemented in a wireless communications system, for instance by a user equipment device at or near a cell edge.

For example, FIG. 7 depicts an example wireless communications system 700 that includes a first macrocell 702 and a second macrocell 704 that neighbors the first macrocell 702. The first macrocell 702 includes a first base station 706 (e.g., an eNB) and a first distributed antenna 708 (e.g., an RRH). The second macrocell 704 includes a second base station 710 (e.g., an eNB) and a second distributed antenna 712 (e.g., an RRH). The wireless communications system 700 may be referred to as a heterogeneous network (HetNet) deployment.

The wireless communications system 700 may include one or more UEs that may be associated with various devices of the wireless communications system 700. As shown, the wireless communications system 700 includes a UE 714 that is associated with the first distributed antenna 708.

As shown, the UE 714 may be located near cell edges of the first and second macrocells 702, 704. In an example of interference that may be observed during operation of the wireless communications system 700, the UE 714 may observe interference originating from one or more of the first base station 706, the second base station 710, and the second distributed antenna 712. The first base station 706 and the first distributed antenna 708 may be configured to perform interference management for the wireless communications system 700, for example without participation by the second base station 710 and the second distributed antenna 712.

Figure 8:
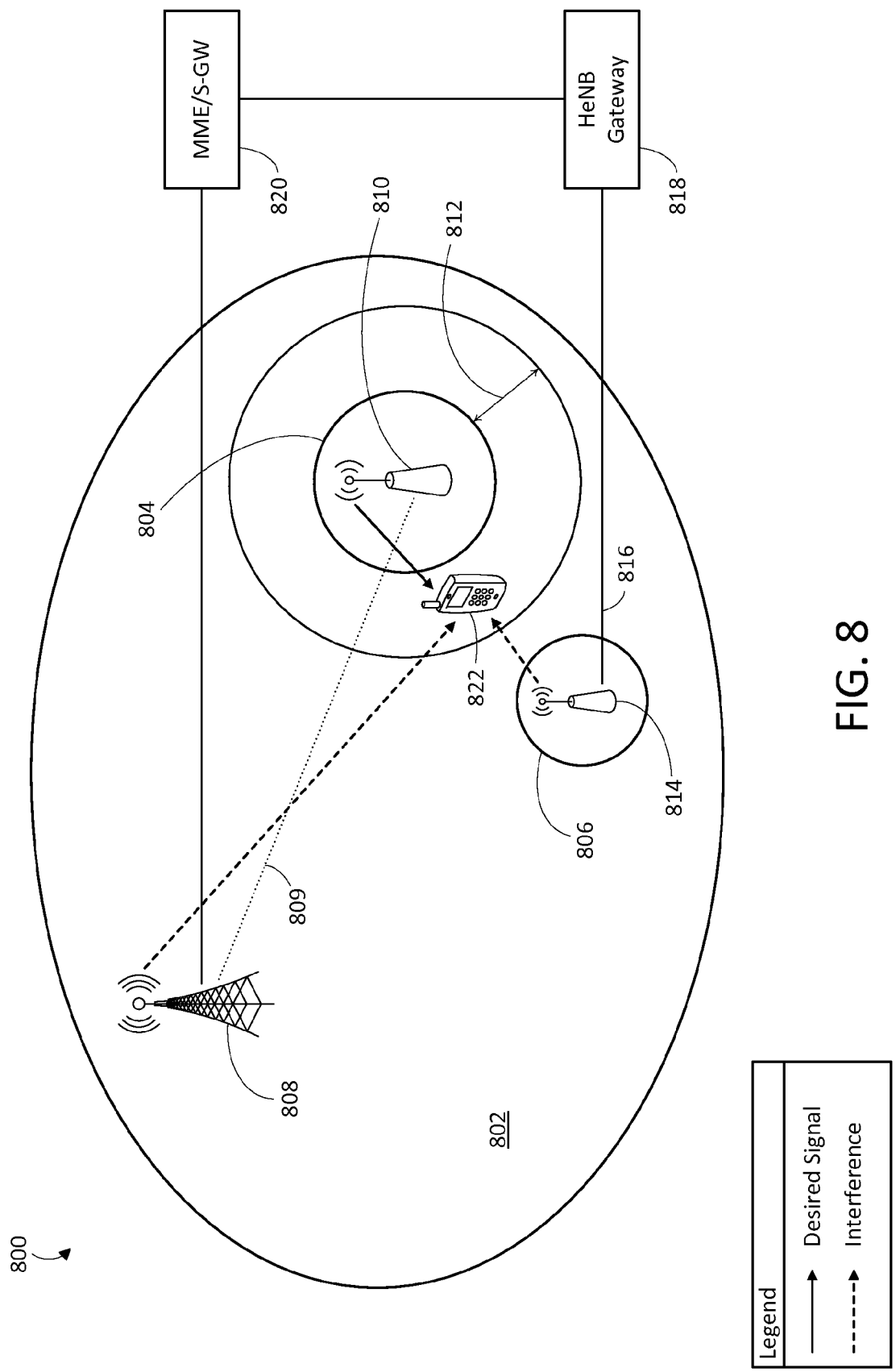
FIG. 8 depicts another example of interference alignment that may be implemented in a wireless communications system that employs cell layers with differing transmission characteristics and/or backhaul connections.

In another example, FIG. 8 depicts an example wireless communications system 800 that includes a macrocell 802, a first small cell 804 (e.g., a picocell) that overlays at least a first portion of the macrocell 802, and a second small cell 806 (e.g., a femtocell) that overlays at least a second portion of the macrocell 802. The macrocell 802 includes a base station 808 (e.g., an eNB). The first small cell 804 includes a first small cell base station 810 (e.g., an eNB). The first small cell 804 may define a corresponding cell range expansion (CRE) region 812. The base station 808 and the first small cell base station 810 may communicate with each other via an interface 809 (e.g., an X2 interface). The second small cell 806 includes a second small cell base station 814 (e.g., an eNB). The second small cell base station 814 may be recognized as a home eNodeB, may be user configured, and may be connected to the core network through a connection 816 (e.g., an IP connection). In an example, the connection 816 between the second small cell base station 814 and the base station 808 may traverse one or more devices, such as an HeNB gateway 818, and/or an MME/serving gateway (S-GW) 820. The wireless communications system 800 may be referred to as a heterogeneous network (HetNet) deployment.

The wireless communications system 800 may include one or more UEs that may be associated with various devices of the wireless communications system 800. As shown, the wireless communications system 800 includes a UE 822 that is associated with the first small cell base station 810.

In an example of interference that may be observed during operation of the wireless communications system 800, the UE 822 may observe interference originating from one or more of the base station 808 and the second small cell base station 814. The interface 809 may have limited capacity and/or latency. Feedback information transmitted over the interface 809 may not be dynamically signaled. Scheduling decisions of the base station 808 may not be known by the first small cell base station 810, and scheduling decisions of the first small cell base station 810 may not be known by the base station 808.

Interference alignment in the wireless communications system 800 may be coordinated, for example using subspace-restricted almost blank subframes (SR-ABS). A number of subframes may be identified, for example using a preconfigured and/or predefined pattern that may be known to the base station 808 and the first small cell base station 810. During transmission of these subframes, the base station 808 may apply a precoding vector for interference alignment. In accordance with how the precoding is determined, the transmitted signal may be restricted within a signal subspace orthogonal to a receiver weight vector $u_R$. Such subframes may be referred to as subspace restricted subframes.

A scheduler of the second small cell base station 814 may be provided with the SR-ABS pattern (e.g., via X2 signaling). The scheduler may schedule data during the SR-ABS subframes to, which may enhance (e.g., maximize) interference suppression.

Figure 9:
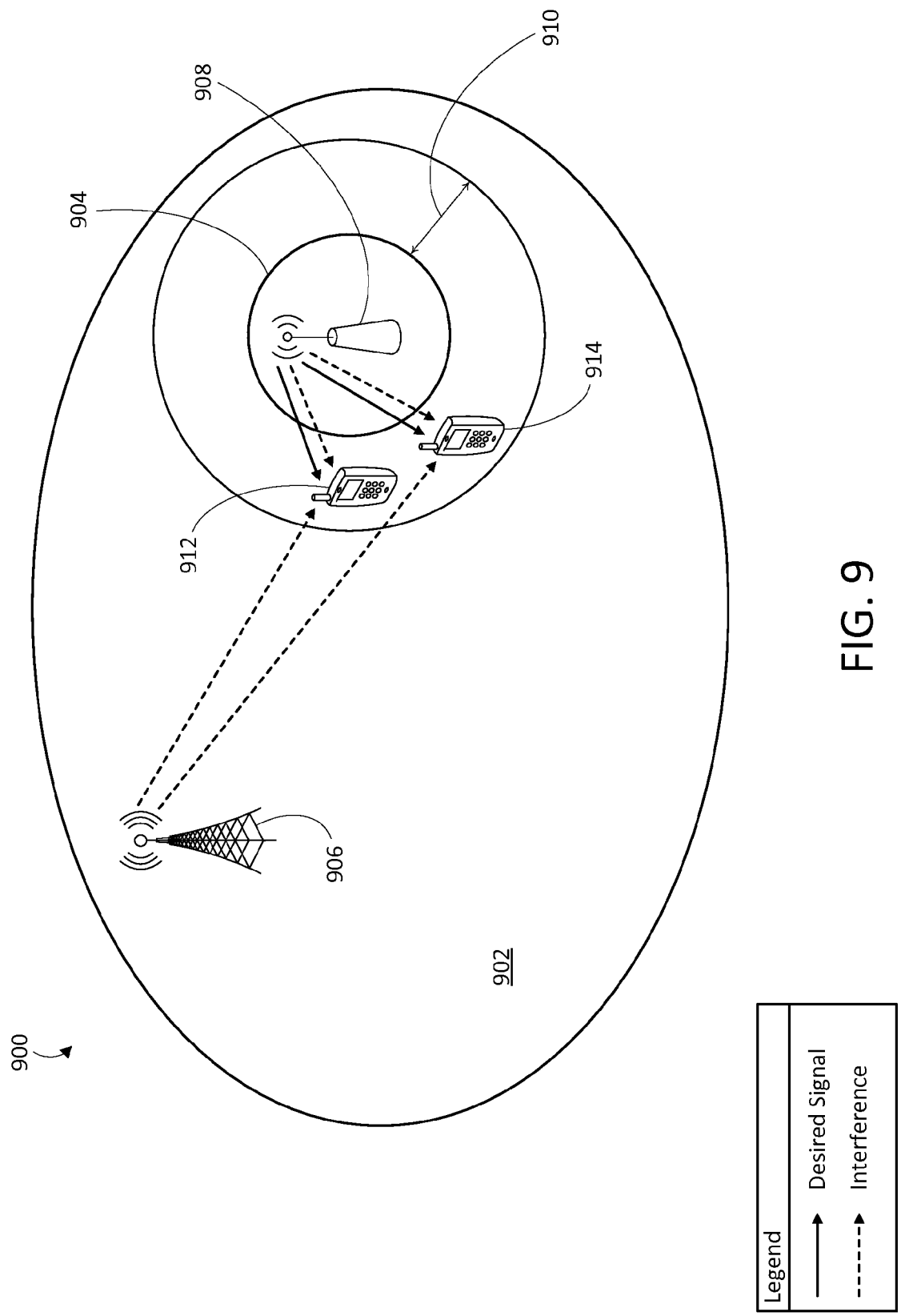
FIG. 9 depicts an example of interference alignment that may be implemented in a wireless communications system that employs multiple-input and multiple-output (MIMO) communication, such as multi-user MIMO.

FIG. 9 depicts an example wireless communications system 900 that may be configured for MU-MIMO communication. As shown, the wireless communications system 900 includes a macrocell 902 and a small cell 904 (e.g., a picocell) that overlays at least a portion of the macrocell 902. The macrocell 902 includes a base station 906 (e.g., an eNB). The small cell 904 includes a small cell base station 908 (e.g., an eNB). The small cell 904 may define a corresponding CRE region 910. The wireless communications system 900 may be referred to as a heterogeneous network (HetNet) deployment.

The wireless communications system 900 may include one or more UEs that may be configured for MU-MIMO communication and may be associated with various devices of the wireless communications system 900. As shown, the wireless communications system 900 includes a first UE 912 and a second UE 914. The first and second UEs 912, 914 are associated with the small cell base station 908. The first and second UEs 912, 914 may be configured to operate in MU-MIMO mode, and may be co-scheduled with data, for example by the small cell base station 908. In an example of interference that may be observed during operation of the wireless communications system 900, the first and second UEs 912, 914 may observe cross-stream interference from one another (e.g., due to a MU-MIMO configuration), and may observe interference from the base station 906 (e.g., when the first and second UEs 912, 914 are located in the CRE region 910.

In accordance with an example implementation of interference alignment, a precoding function applied by a scheduler of the small cell base station 908 may be improved (e.g., optimized or jointly optimized), so as to mitigate (e g, minimize) MU-MIMO leakage across the first and second UEs 912, 914, and/or to suppress interference from the base station 906 that is observed at the first and second UEs 912, 914.

One or both of the first and second UEs 912, 914 may be configured to perform an interference alignment process. For example, the first and second UEs 912, 914, when co-scheduled in MU-MIMO mode, may perform CSI measurements over respective links from the first and second UEs 912, 914 to the base station 906 and/or the small cell base station 908. The first and second UEs 912, 914 may compute, based on the CSI measurements, respective CSI matrices from the first and second UEs 912, 914 to the base station 906, and/or the small cell base station 908.

Based on the respective CSI matrices from the first and second UEs 912, 914 to the base station 906, the first and second UEs 912, 914 may calculate respective receiver weight vectors. The receiver weight vectors may be designed to improve (e.g., optimize) interference suppression performance of interfering transmissions from the base station 906 to the first and second UEs 912, 914. Null vectors may be used for the receiver weight vectors. Each null vector may be orthogonal to a corresponding CSI matrix to the base station 906.

The first and second UEs 912, 914 may be configured to report information pertaining to one or more interference measurements (e.g., CSI measurements) performed by the first and second UEs 912, 914. For example, the first and second UEs 912, 914 may send respective feedback reports. A feedback report may include, for example, a corresponding weight vector, the CSI matrix to the small cell base station 908. The first and second UEs 912, 914 may be configured to send feedback reports to one or more other devices in the wireless communications system 900. For example, the first and second UEs 912, 914 may be configured to send the feedback reports to the scheduler of the small cell base station 908. The first and second UEs 912, 914 may be configured to combine the weight vector with the CSI matrix in the feedback report, which may reduce signaling overhead.

Based on information in the feedback reports, the scheduler of the small cell base station 908 may be configured to determine MU-MIMO precoding vectors related to the first and second UEs 912, 914, that may be used to align cross-UE leakage (e.g., from the first UE 912 to the second UE 914 or from the second UE 914 to the first UE 912) with interfering signals originating from the base station 906 and observed at the UE 522. The first and second UEs 912, 914 may be co-scheduled for data transmission, for example using the precoding vectors determined during the interference alignment process.

Figure 10:
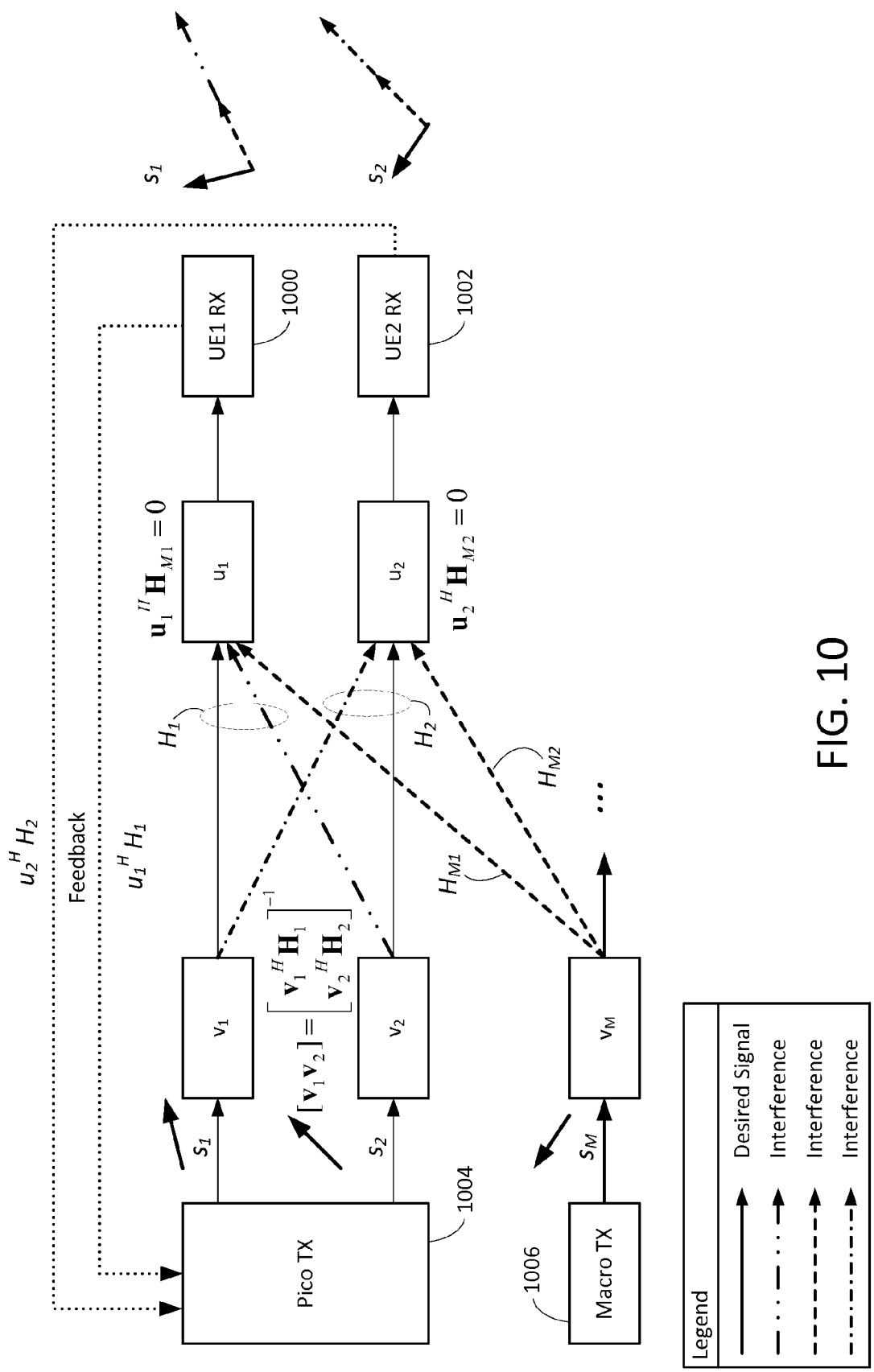
FIG. 10 illustrates an example interference alignment solution that may be implemented in a wireless communications system that employs MIMO communication.

FIG. 10 depicts a system model of an example interference alignment implementation that may be applied to a wireless communications system configured for MU-MIMO communication. As shown, a first UE 1000 and a second UE 1002 may be co-scheduled, for example by a scheduler of a small cell base station 1004 (e.g., of a picocell). The first and second UEs 1000, 1002 may be configured to determine respective receiver weight vectors, for example using $u_1^H H_{M1}=0$ and $u_2^H H_{M2}=0$, to null out interference originating from a macrocell base station 1006 (e.g., an eNB). The first and second UEs 1000, 1002 may provide the receiver weight vectors, which may represent feedback, to the scheduler of the small cell base station 1004. The small cell base station 1004 may calculate precoding vectors (e.g., optimal precoding vectors). The precoding vectors may be determined, for example, using a zero forcing algorithm, such as:

$$[v_1 \; v_2] = \begin{bmatrix} v_1^H H_1 \\ v_2^H H_2 \end{bmatrix}^{-1} \tag{5}$$

This process may be applied (e.g., directly) to other cases where one or more MU-MIMO UEs observe interference from signals originating from other transmission points. In an example, an interfering transmission point may be a neighboring small cell base station (e.g., a picocell eNB) in a common HetNet deployment. In an example, an interfering transmission point may be a small cell base station (e.g., a femtocell eNB) in a multi-layer HetNet deployment. In still another example, in a homogeneous network, UEs may be co-scheduled by a first base station (e.g., an eNB) of a first macrocell, and an interfering transmission point may be a second base station (e.g., an eNB) of a second macrocell that neighbors the first macrocell.

Figure 11:
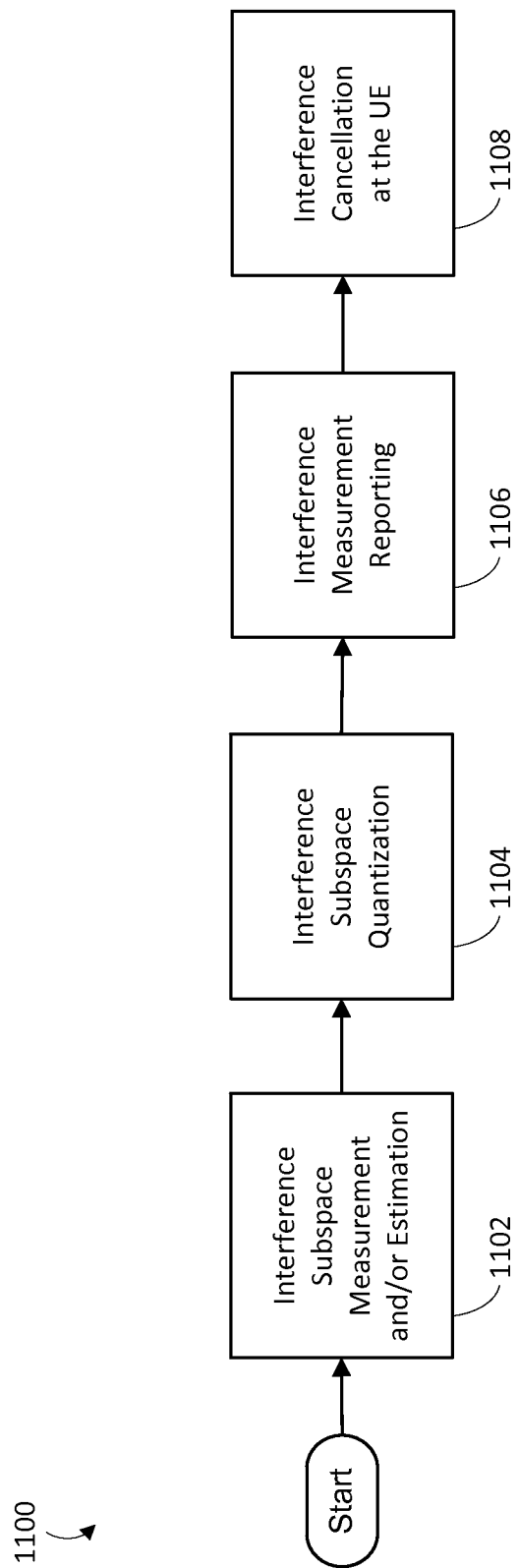
FIG. 11 illustrates an example interference alignment process that may be performed by a wireless communication device, such as a user equipment device.

FIG. 11 illustrates an example interference alignment process 1100 that may be performed by a wireless communication device, such as a UE. The example interference alignment process 1100 may be implemented in accordance with any of the example wireless communications systems described herein. For instance, the example interference alignment process 1100 may be performed by one or more respective UEs associated with any of the example wireless communications systems described herein.

In accordance with an example implementation of interference alignment, a UE may provide an estimate of an interference subspace related to the UE to one or more other network devices. At 1102, the UE may perform interference subspace measurement and/or estimation. An estimated interference subspace may represent interference coming from one or more transmission points (TPs) within an interference alignment measurement set. The estimated interference subspace may correspond, for example, to interference originating from inside and outside of the interference alignment measurement set (e.g., an aggregated interference). The UE may be configured with one or multiple interference alignment measurement sets. A configuration may be signaled to the UE, for example through a higher layer or as a part of a physical layer grant.

An interference alignment measurement set may be dynamically and/or semi-statically changed, for example in accordance with one or more factors. Such factors may include, for example, one or more of a signal to interference plus noise (SINR) operation region, a number of TPs taking part in the interference alignment process, an interference environment and/or statistics, a deployment scenario, a transmission format, a system load, and the like. Assuming independent interference terms, a correlation matrix of aggregated interference (e.g., from all interfering transmission points) at a receiver k of the UE, may be represented as:

$$\Lambda_k = \Sigma_{l \neq k} H_{k,l} P_l P_l^* H_{k,l}^* \qquad (6)$$

where $H_{k,l}$ may be a channel between transmission point l and receiver k, and $P_l$ may be a precoder used at the transmitter l.

A UE may perform interference measurement of an aggregated (e.g., total) interference observed by a receiver of the UE (e.g., representative of all interfering signals observed at receiver of the UE). A UE may perform separate interference measurements directed toward discrete sources of interference (e.g., respective measurements of interfering signals that originate from individual transmission points). For example, with the use of muting, a UE may measure interference alternatively for each of a plurality of interference sources.

A UE may perform interference estimation, for example using subspace decomposition. An estimation may be assumed for quantization and/or reporting, for example based on a total dimension of the interference space, or may be limited to dominant dimensions of the interference space.

In an LTE wireless communications system, a UE may perform interference subspace estimation on a subset of resource elements (RE) that may be configured by the network. A UE may use REs corresponding to one or more resources for interference measurement, for example including one or more of cell specific reference signals (CRS), non-zero power (NZP) channel state information reference symbols (CSI-RS), zero power (ZP) CSI-RSs, demodulation reference symbols (DM-RS), and interference measurement resources (IMR).

A UE may perform interference subspace estimation using CRSs. A UE may estimate a channel, for example using CRSs of an associated serving cell. The UE may remove a reference signal contribution from the received signal, in order to obtain a covariance matrix of the interference subspace.

If a UE is provided with CRS information of respective interferers of one or more neighboring cells, the UE may apply this information to estimate (e.g., explicitly) interference contributions corresponding to the respective interferers. The UE may construct a total interference subspace matrix, for example by summing up the interference contributions of the respective interferers.

A UE may perform interference subspace estimation using NZP CSI-RSs. A UE may estimate corresponding channels of one or more interferers within an interference measurement set using, for example, configured NZP CSI-RS resources of the interferer (e.g., $\hat{H}_{k,l}$). Depending on knowledge of the UE about precoding applied at the interferers within the interference measurement set (e.g., $P_l$), the UE may construct a precoding matrix.

A UE may have prior knowledge regarding respective precoding matrices applied at the interfering transmission points. The UE may obtain this information, for example, from the network though higher layer configuration. The UE may construct a corresponding interference subspace matrix by, for example, utilizing explicit knowledge of the precoding matrix and/or channel estimates of the interferers within an interference measurement set, in accordance with:

$$\Sigma_{l \neq k} \hat{H}_{k,l} P_l P_l^* \hat{H}_{k,l}^*. \qquad (7)$$

A UE may not have prior knowledge regarding respective precoding matrices applied at the interfering transmission points. The UE may be configured to acquire this information, for example independently (e.g., autonomously). As an example, for the interferers within the interference measurement set, the UE may determine respective precoding matrices that may increases (e.g., maximizes) a received power, for example using the following function:

$$\arg\max_{P_l; l=1,\ldots,L} |r|^2 \qquad (8)$$

where r may be a received vector on the NZP CSI-RS resources and L may be a number of admissible precoders within the set of a predefined codebook.

The UE may construct a corresponding interference subspace matrix by utilizing a channel estimate (e.g., $\hat{H}_{k,l}$) and precoding matrix estimates (e.g., $\hat{P}_l$), which may be obtained from an optimization operation, in accordance with:

$$\Sigma_{l \neq k} \hat{H}_{k,l} \hat{P}_l \hat{P}_l^* \hat{H}_{k,l}^*. \qquad (9)$$

FIGS. 12A and 12B illustrate example configuration modes for interference measurements of a wireless communications system (e.g., the wireless communications system 200 depicted in FIG. 2). The modes depicted in FIGS. 12A and 12B may represent configuration definitions for separate and aggregated interference subspace measurement, respectively, using NZP CSI-RSs. The patterns of muted and/or CSI-RS resource use may be configured semi-statically, and may be exchanged among base stations (e.g., eNBs), for example via an X2 interface.

FIG. 13 illustrates exemplary configuration modes for interference measurements of a wireless communications system (e.g., the wireless communications system 400 depicted in FIG. 4). The patterns of muted and/or CSI-RS resource use may be configured (e.g., dynamically) by a centralized scheduler.

A UE may perform interference subspace estimation using ZP CSI-RSs. A UE may perform aggregated or separate interference subspace measurements without knowledge of respective channels and/or precoding matrices of the interferers. The UE may estimate a covariance matrix of received interfering signals on configured ZP CSI-RS resources, such as:

$$\Lambda = E\{rr^*\} \quad (10)$$

The UE may determine a type of the resource elements of the interfering signals. For example, the UE may determine whether the interfering resource elements are muted and/or whether precoded data is used. The UE may obtain such information, for example from the network.

FIGS. 14A and 14B illustrate example configuration modes for interference measurements of a wireless communications system (e.g., the wireless communications system 200 depicted in FIG. 2). The depicted in FIGS. 14A and 14B may represent the configuration definitions for separate and aggregated interference subspace measurement, respectively, using ZP CSI-RSs. Because muted resources may not be used for data transmission by a respective transmission point, the mode depicted in FIG. 14A may have an additional overhead (e.g., for resource usage) in comparison to the mode depicted in FIG. 14B.

A UE may perform interference subspace estimation using DM-RSs. Channel and/or precoder information may be embedded in DM-RS resources, such that the UE may not be configured to estimate channel and/or precoder information. The UE may estimate respective effective channels, $H_l'$, for interferers within an interference measurement set, for example based on respective DM-RS resources, such as:

$$H_l' = H_{k,l} P_l \quad (11)$$

A UE may obtain information about respective DM-RS resources of the interferers implicitly or explicitly. For example, the UE may use configured muted DM-RS resources to estimate the interference caused by an interferer within an interference measurement set. In accordance with a configuration, muted DM-RS resources may reduce interference observed by DM-RS transmissions for one or more co-scheduled UEs, for example by avoiding collisions between data and reference symbols. A UE may be configured ignore these resources during a physical downlink shared channel (PDSCH) detection process. The muted DM-RS resources may be utilized for interference estimation.

FIG. 15 illustrates an example of aggregated interference subspace measurement using DM-RS within an LTE subframe. This may be implemented, for example, in the wireless communications system 400 depicted in FIG. 4. For example, respective DM-RS resources assigned to the first and third UEs 410, 414 may be code-division multiplexed (CDM) and may not collide with DM-RS resources of the second UE 412.

The UE may construct a corresponding interference subspace matrix by utilizing an effective channel estimate (e.g., $\hat{H}_l'$), in accordance with:

$$\Sigma_{l \neq k} \hat{H}_l' \hat{H}_l'^* \quad (12)$$

A UE may perform interference subspace estimation using IMRs. A UE may compute respective estimates of observed interference sources separately, using IMR resources. A UE may compute an aggregated estimate of observed interference sources using IMR resources. These resources may be ZP or NZP, and may be dedicated for interference measurements. An overlap may exist between IMR resources and CSI-RS resources.

IMR resources may be defined per transmission point. The resources may or may not be orthogonalized through corresponding resource definitions in frequency, time, and/or code domains. An interference measurement using such IMR resources may be performed, for example, in accordance with FIG. 12A.

IMR resources may be defined for a set of transmission points (e.g., collectively). The IMRs may be defined for a set of the transmission points. Respective interference contributed by the transmission points may be separated and/or estimated, for example using orthogonal codes in time or frequency. An interference measurement using such IMR resources may be performed, for example, in accordance with FIG. 12B.

With continued reference to FIG. 11, at 1104 the UE may quantize the estimated interference subspace to a quantization subspace. The quantization subspace may be closes to an interference subspace of the UE. Assuming that the codebook contains $2^B$ quantization vectors, the UE may determine the index of the codebook matrix $\Gamma_j$ that may limit (e.g., minimize) a distance between the two M dimensional subspaces $\Lambda$ and $\Gamma$. For example, for a vector transmission, a quantization index may be computed in accordance with the following:

$$\arg\max_{j=1,\ldots,2^B} d(\Lambda, \Gamma_j) \quad (13)$$

where B may be a number of feedback bits, and d(a,b) may be a subspace distance function for vector arguments a and b.

In an LTE-based wireless communications system, a UE may perform interference matrix quantization, for example using one or more of a set of predefined codebooks, a non-backward compatible codebook set, or an adaptive codebook. A set of predefined codebooks may be used for precoding matrix indicator (PMI) estimation. A non-backward compatible codebook set may be designed in accordance with one or more interference characteristics of a communication channel. An adaptive codebook may be linked to a deployment scenario and/or to an antenna configuration (e.g., a cross-polarized array or a uniform linear array).

At 1106, the UE may report information pertaining to one or more interference measurements performed by the UE. For example, the UE may send a feedback report that includes the interference measurement information to one or more devices in a communications system. For example, the UE may send the feedback report to a corresponding serving cell (e.g., to a base station that the UE is associated with).

The feedback report may include, for example, an interference matrix indicator (IMI). The UE may be configured to send the feedback report periodically (e.g., via a physical uplink control channel (PUCCH)). The UE may be configured to send the feedback report aperiodically (e.g., a physical uplink shared channel (PUSCH)). The UE may be configured to compute the IMI over a full bandwidth (e.g., wideband interference), such that the feedback report may include a single IMI. The UE may be configured to compute respective IMIs (e.g., per subband). In accordance with per subband IMI computation, the UE may estimate a frequency selective interference subspace and may send multiple feedback reports. Such a feedback report may correspond to an individual subband or to a plurality of subbands.

The serving cell may receive the interference subspace estimate (e.g., in a feedback report) from the UE. The serving cell may share this information with one or more transmission points may be involved in the interference alignment process. To illustrate, in a wireless communications system (e.g., a HetNet) where inter-cell interference alignment is implemented (e.g., as in the wireless communications system 200 depicted in FIG. 2), interference subspace estimate information may enable one or macrocells to manage interference, for example by aligning respective transmission signals onto a signal subspace. This signal subspace may be orthogonal, for example, with respect to the signal subspace of a transmitted signal (e.g., a signal transmitted from the first small cell base station 214 to the first UE 222).

At 1108, UE may perform interference mitigation (e.g., interference suppression and/or interference cancellation) on one or more interfering signals observed at the UE. The UE may perform such interference mitigation at a receiver of the UE, for example on one or more interfering signals that are aligned in the quantization subspace.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). A processor in association with software may be used to implement a radio frequency transceiver for use in a WTRU, WTRU, terminal, base station, RNC, or any host computer. Features and/or elements described herein in accordance with one or more example embodiments may be used in combination with features and/or elements described herein in accordance with one or more other example embodiments.

What is claimed:

1. A method for mitigating interference received at a user equipment (UE) that is associated with a macrocell of a wireless communication system, the method comprising, by the UE:
    measuring first interference received at the UE, the first interference generated by a transmission from a base station of the macrocell;
    measuring second interference received at the UE, the second interference generated by a transmission from a second source of interference that is not a device of the macrocell;
    generating a first channel state information (CSI) matrix based on a first CSI measurement performed on a first link between the UE and the second source of interference that is not a device of the macrocell;
    calculating a receiver weight vector based on the first CSI matrix corresponding to the first link between the UE associated with the macrocell and the second source of interference that is not a device of the macrocell;
    generating a second CSI matrix based on a second CSI measurement performed on a second link between the UE and a distributed antenna of the macrocell;
    generating a third CSI matrix based on a third CSI measurement performed on a third link between the UE and the base station; and
    sending a feedback report to the base station of the macrocell, the feedback report including the receiver weight vector based on the first CSI matrix corresponding to the first link between the UE associated with the macrocell and the second source of interference that is not a device of the macrocell, the second CSI matrix corresponding to the second link between the UE and the distributed antenna of the macrocell, and the third CSI matrix corresponding to the third link between the UE and the base station of the macrocell.

2. The method of claim 1, wherein the second source of interference comprises a small cell base station of a small cell that is located within a coverage area of the macrocell.

3. The method of claim 1, wherein the second source of interference comprises a second macrocell that neighbors the macrocell.

4. The method of claim 1, further comprising:
    performing interference mitigation on respective signals received at the UE from the base station and the second source of interference, wherein the respective signals are aligned relative to each other in accordance with the feedback report.

5. The method of claim 1, further comprising:
    receiving a signal at the UE from the distributed antenna, the signal indicative of being optimized in accordance with the feedback report.

6. The method of claim 1, wherein the feedback report is sent to the base station via the distributed antenna.

7. The method of claim 1, wherein the receiver weight vector is combined with the second and third CSI matrices in the feedback report.

8. The method of claim 1, wherein the first, second, and third CSI measurements are performed by the UE.

9. The method of claim 1, wherein the receiver weight vector comprises a null vector that is orthogonal to the first CSI matrix.

10. A user equipment (UE) that is associated with a macrocell of a wireless communication system, the UE comprising:
    a processor; and
    a memory comprising instructions that when executed by the processor cause the UE to:
        measure first interference received at the UE, the first interference generated by a transmission from a base station of the macrocell;
        measure second interference received at the UE, the second interference generated by a transmission from a second source of interference that is not a device of the macrocell;
        generate a first channel state information (CSI) matrix based on a first CSI measurement performed on a first link between the UE and the second source of interference that is not a device of the macrocell;
        calculate a receiver weight vector based on the first CSI matrix corresponding to the first link between the UE associated with the macrocell and the second source of interference that is not a device of the macrocell;

generate a second CSI matrix based on a second CSI measurement performed on a second link between the UE and a distributed antenna of the macrocell;

generate a third CSI matrix based on a third CSI measurement performed on a third link between the UE and the base station; and send a feedback report to the base station of the macrocell, the feedback report including the receiver weight vector based on the first CSI matrix corresponding to the first link between the UE associated with the macrocell and the second source of interference that is not a device of the macrocell, the second CSI matrix corresponding to the second link between the UE and the distributed antenna of the macrocell, and the third CSI matrix corresponding to the third link between the UE and the base station of the macrocell.

11. The UE of claim 10, wherein the second source of interference comprises a small cell base station of a small cell that is located within a coverage area of the macrocell.

12. The UE of claim 10, wherein the second source of interference comprises a second macrocell that neighbors the macrocell.

13. The UE of claim 10, wherein the instructions, when executed by the processor, further cause the UE to:

perform interference mitigation on respective signals received from the base station and the second source of interference, wherein the respective signals are aligned relative to each other in accordance with the feedback report.

14. The UE of claim 10, wherein the instructions, when executed by the processor, further cause the UE to:

receive a signal from the distributed antenna, the signal indicative of being optimized in accordance with the feedback report.

15. The UE of claim 10, wherein the instructions, when executed by the processor, further cause the UE to send the feedback report to the base station via the distributed antenna.

16. The UE of claim 10, wherein the instructions, when executed by the processor, further cause the UE to combine the receiver weight vector with the second and third CSI matrices in the feedback report.

17. The UE of claim 10, wherein the instructions, when executed by the processor, further cause the UE to perform the first, second, and third CSI measurements.

18. The UE of claim 10, wherein the receiver weight vector comprises a null vector that is orthogonal to the first CSI matrix.

* * * * *